United States Patent
Yang et al.

(10) Patent No.: US 12,391,888 B2
(45) Date of Patent: Aug. 19, 2025

(54) SOLID PARTICLE BED, FIXED BED, AND OIL HYDROGENATION METHOD

(71) Applicants: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

(72) Inventors: Chengmin Yang, Liaoning (CN); Li Liu, Liaoning (CN); Yang Li, Liaoning (CN); Weiyu Duan, Liaoning (CN); Rong Guo, Liaoning (CN); Yong Zhou, Liaoning (CN); Yunhai Yao, Liaoning (CN); Bumei Zheng, Liaoning (CN); Jin Sun, Liaoning (CN)

(73) Assignees: CHINA PETROLEUM & CHEMICAL CORPORATION, Beijing (CN); SINOPEC DALIAN RESEARCH INSTITUTE OF PETROLEUM AND PETROCHEMICALS CO., LTD., Liaoning (CN)

( * ) Notice: Subject to any disclaimer, the term of this patent is extended or adjusted under 35 U.S.C. 154(b) by 235 days.

(21) Appl. No.: 18/247,773

(22) PCT Filed: Dec. 15, 2021

(86) PCT No.: PCT/CN2021/138368
§ 371 (c)(1),
(2) Date: Apr. 4, 2023

(87) PCT Pub. No.: WO2022/135235
PCT Pub. Date: Jun. 30, 2022

(65) Prior Publication Data
US 2023/0348797 A1    Nov. 2, 2023

(30) Foreign Application Priority Data

Dec. 22, 2020 (CN) .......................... 202011526433.2
Dec. 22, 2020 (CN) .......................... 202011526437.0

(51) Int. Cl.
*C10G 45/04* (2006.01)

(52) U.S. Cl.
CPC ....... *C10G 45/04* (2013.01); *C10G 2300/703* (2013.01)

(58) Field of Classification Search
CPC ............ B01J 8/001; B01J 8/02; B01J 8/0242; B01J 8/0271; B01J 8/0465; B01J 8/0484;
(Continued)

(56) References Cited

U.S. PATENT DOCUMENTS

| | | |
|---|---|---|
| 3,006,740 A | 10/1961 | Maggio |
| 6,780,817 B1 | 8/2004 | Koyama et al. |
| 2002/0102192 A1 | 8/2002 | Ward |

FOREIGN PATENT DOCUMENTS

| | | |
|---|---|---|
| CN | 1104558 A | 7/1995 |
| CN | 1410152 A | 4/2003 |

(Continued)

*Primary Examiner* — Brian A McCaig
(74) *Attorney, Agent, or Firm* — NKL Law; Allen Xue

(57) ABSTRACT

A solid particle bed has a sea zone and at least one island zone distributed in the sea zone, and has an upper surface, a lower surface, an axial direction and a radial direction. The island zone extends along the axial direction of the solid particle bed but does not extend to the lower surface, and the voidage of the island zone is 110-300% of the voidage of the sea zone. In the solid particle bed, the oil preferentially enters the packing area with a small voidage through the tail section of the packing area with a large voidage. As the deposition amount increases, the oil gradually changes its way by entering the packing area with a small voidage through the side of the packing area with a large voidage.

27 Claims, 3 Drawing Sheets

○-Catalyst D1
△-Catalyst A1

(58) Field of Classification Search
CPC .......... B01J 21/04; B01J 21/12; B01J 23/002;
B01J 23/745; B01J 23/75; B01J 23/882;
B01J 23/88; B01J 23/888; B01J 35/19;
B01J 35/40; B01J 35/54; B01J 35/60;
B01J 37/0201; B01J 37/08; B01J 37/088;
B01J 37/20; B01J 2208/025; C10G 45/00;
C10G 45/04; C10G 49/002; C10G
2300/703
See application file for complete search history.

(56) References Cited

FOREIGN PATENT DOCUMENTS

| | | |
|---|---|---|
| CN | 101928592 A | 12/2010 |
| CN | 101940848 A | 1/2011 |
| CN | 102211044 A | 10/2011 |
| CN | 103805242 A | 5/2014 |
| CN | 107512787 A | 12/2017 |
| CN | 207951039 U | 10/2018 |
| CN | 110052093 A | 7/2019 |
| EP | 4197631 A1 | 6/2023 |
| RU | 2318581 C2 | 3/2008 |
| RU | 2514950 C1 | 5/2014 |
| RU | 2638168 C2 | 12/2017 |
| WO | 9920384 A1 | 4/1999 |

SOLID PARTICLE BED, FIXED BED, AND OIL HYDROGENATION METHOD

TECHNICAL FIELD

The present application relates to the technical field of hydrogenation of oils, particularly to a solid particle bed, a fixed bed comprising the solid particle bed and application of those beds in hydrogenation of oils.

BACKGROUND ART

Due to the influence of impurities, various oils should be used after the quality thereof being improved by hydrogenation. For example, ethylene pyrolysis gasoline, coker naphtha, catalytic gasoline, fischer-tropsch synthesis oil, coker diesel, catalytic diesel, high dry point straight run diesel oil, wax oil, residual oil, coal tar, coal hydrogenation product oil and the like, mostly comprise impurities such as sulfur, nitrogen, oxygen, olefins, aromatics and the like, and usually need to be hydrorefined to remove the impurities therein for use. In the hydrofining process, the increase of pressure drop caused by factors such as coking or mechanical impurities often appears in the processing of inferior oils.

The magnitude of the pressure drop is closely related to the voidage of the catalyst bed. At present, in order to reduce the increase of pressure drop, particulate matters with larger voidage are filled in an inlet section of a reactor, and particularly, protective agents with various shapes are filled in an inlet section of a first reactor in fixed bed hydrogenation process for residual oil to prolong the running period of the reactor.

Chinese patent No. CN101928592A discloses a graded combination of hydrogenation catalysts, in which the reactor is filled with hydrodemetallization catalyst and hydrodesulfurization catalyst, respectively, from top to bottom; the feedstock stream is passed from top to bottom, the catalyst activity is gradually increased, the pore diameter is gradually reduced, the particle size is gradually reduced, and the porosity is gradually reduced along the flow direction.

Chinese patent No. CN 1104558A discloses a process and catalyst system for hydrotreating hydrocarbon feedstocks, wherein the feedstock is passed through a fixed bed catalyst system of hydrotreating catalysts, which comprises a physical mixture of catalyst particles with a high voidage and catalyst particles with a low voidage, the particles being mixed at different amounts in different layers of the catalyst bed, thereby forming a layered structure in the fixed bed catalyst system, the mixing ratio of the particles with a high voidage and the particles with a low voidage being different in the different layers.

DISCLOSURE OF THE INVENTION

The inventors of the present application have found that coking easily occurs at the top of the hydrorefining reactor during the hydrogenation of catalytic gasoline, coke powder deposition and carbon deposit coking easily occur at the top of the reactor during the hydrogenation of coking diesel, coking easily occurs at the top of the reactor during the hydrogenation of coal tar, and a direct consequence of the coking at the top is that the pressure drop of a catalyst bed at the inlet section of the reactor is increased. As a result, the catalyst has a small capacity for adsorption and deposition of sediments, which will bring about the quick rise of pressure drop of the bed and then result in a shortened operating cycle. The inventors of the present application have found through further research that, by using a specific catalyst grading method, the dispersion and deposition of sediments in the oil can be realized, the adsorption and deposition capacity of the catalyst for sediments can be increased, so that the rise of the pressure drop of the bed can be effectively delayed, and the operating cycle can be prolonged. The present application has been completed based on the above finding.

Specifically, the present application relates to the following aspects.

1. A catalyst grading method used in the hydrogenation of oils, comprising providing a grading packing section at an inlet end of a reactor, dividing the space of the grading packing section into a plurality of columnar reaction cells parallel to the material flow direction, and packing a hydrogenation catalyst I and a hydrogenation catalyst II in every two adjacent columnar reaction cells, respectively, in a manner that edges of the columns are in contact with each other, wherein the voidage of the hydrogenation catalyst I is greater than that of the hydrogenation catalyst II.

2. The catalyst grading method according to any of the preceding or subsequent aspects, wherein the height of the catalyst bed in the grading packing section accounts for 1-95%, preferably 3-60%, and more preferably 4-50% of the total height of the bed in the reactor.

3. The catalyst grading method according to any of the preceding or subsequent aspects, wherein the remainder of the reactor is loaded with a conventional hydrogenation catalyst with a voidage not greater than that of the hydrogenation catalyst II in the grading packing section.

4. The catalyst grading method according to any of the preceding or subsequent aspects, wherein the voidage of the catalyst bed formed by packing the hydrogenation catalyst I is 0.30-0.80, and the voidage of the hydrogenation catalyst I used in the grading is 110-300% of that of the hydrogenation catalyst II.

5. The catalyst grading method according to any of the preceding or subsequent aspects, wherein the hydrogenation catalyst I presents in the form of hollow and/or toothed particles.

6. The catalyst grading method according to any of the preceding or subsequent aspects, wherein the hydrogenation catalyst I and the hydrogenation catalyst II are loaded in every two adjacent columnar reaction cells, respectively, in a manner that edges of the columns are contacted with each other, which means specifically that the two catalysts are loaded in an adjacently alternate manner or in an insertion manner.

7. The catalyst grading method according to any of the preceding or subsequent aspects, wherein the adjacently alternate manner is a packing manner in which the same catalyst is packed into a columnar reaction cell along the material flow direction, and, when viewed from the radial direction, the two different catalysts are packed in every two adjacent columnar reaction cells respectively; the cross section of each columnar reaction cell can be in any shape.

8. The catalyst grading method according to any of the preceding or subsequent aspects, wherein the insertion manner is a packing manner in which the hydrogenation catalyst I is packed into columnar bodies separated from each other along the material flow direction to form the columnar reaction cell, the hydrogenation catalyst II is packed in the rest position to form a continuous or discontinuous columnar reaction cell with a cross section having an irregular shape, and the columnar reaction cell formed by the hydrogenation catalyst I is uniformly inserted in the columnar reaction cell of the hydrogenation catalyst II as much as possible.

9. The catalyst grading method according to any of the preceding or subsequent aspects, wherein in the same reactor, the hydrogenation catalyst I and the hydrogenation catalyst II used in the grading packing section are not limited to catalysts with a single voidage, but the voidage of any hydrogenation catalyst I is greater than that of any hydrogenation catalyst II.

10. The catalyst grading method according to any of the preceding or subsequent aspects, wherein, on the same radial section, the shortest distance from any point in the cross section of a columnar reaction cell of the hydrogenation catalyst II to an edge of the cross section of an adjacent columnar reaction cell of the hydrogenation catalyst I is not greater than 500 mm, preferably not greater than 300 mm, more preferably not greater than 200 mm and most preferably not greater than 100 mm.

11. The catalyst grading method according to any of the preceding or subsequent aspects, wherein the total cross-sectional area of the columnar reaction cells of the hydrogenation catalyst I accounts for 10-60% of the total cross-sectional area of the reactor.

12. The catalyst grading method according to any of the preceding or subsequent aspects, wherein the hydrogenation catalyst I has a particle size of 2.0-55.0 mm and the hydrogenation catalyst II has a particle size of 0.5-4.0 mm.

13. The catalyst grading method according to any of the preceding or subsequent aspects, wherein calculated by the mass content of the oxide of the active metals, the content of the active metal in hydrogenation catalyst I is 10-90% of that of the hydrogenation catalyst II graded with the hydrogenation catalyst I.

14. The catalyst grading method according to any of the preceding or subsequent aspects, wherein the hydrogenation active metal in the hydrogenation catalyst I, the hydrogenation catalyst II and the conventional hydrogenation catalyst packed in the rest of the reactor is at least one selected from the group consisting of Fe, Co, Ni, Cu, Zn, Cr, Mo, and W.

15. The catalyst grading method according to any of the preceding or subsequent aspects, wherein the hydrogenation catalyst I comprises a carrier and hydrogenation active metal, wherein the amount of the hydrogenation active metal, calculated as oxide, accounts for 5-30% of the weight of the catalyst, and the carrier is at least one selected from the group consisting of activated carbon, alumina, silica, magnesia, zirconia, titania, and molecular sieves.

16. The catalyst grading method according to any of the preceding or subsequent aspects, wherein the hydrogenation catalyst II and the conventional hydrogenation catalyst are catalysts with hydrodesulfurization activity, and are at least one selected from the group consisting of supported catalysts and unsupported catalysts.

17. The catalyst grading method according to any of the preceding or subsequent aspects, wherein the supported catalyst comprises a carrier and hydrogenation active component, and a catalyst modified on this basis, and the hydrogenation active component is present in an amount of 15-40% by mass, calculated as metal oxide, based on the total weight of the catalyst.

18. The catalyst grading method according to any of the preceding or subsequent aspects, wherein the unsupported catalyst comprises at least a necessary binder and hydrogenation active component, wherein the hydrogenation active component is present in an amount of 30-80% by mass, calculated as metal oxide, based on the total weight of the catalyst.

19. A process for hydrogenation of oils, comprising grading packing a hydrogenation catalyst I and a hydrogenation catalyst II according to the method of any of the preceding or subsequent aspects, packing the rest part of the reactor with a conventional hydrogenation catalyst with hydrodesulfurization activity, subjecting the conventional hydrogenation catalyst to sulfidation after the completion of the packing, and then introducing the oil for hydrogenation.

20. The process according to any of the preceding or subsequent aspects, wherein the oil is at least one selected from the group consisting of ethylene pyrolysis gasoline, coker naphtha, catalytic gasoline, fischer-tropsch synthesis oil, coker diesel, catalytic diesel, high dry point straight run diesel oil, wax oil, residual oil, coal tar and coal hydrogenation product oil.

Particularly, the present application relates to the following aspects.

1. A section of a solid particle bed (particularly an axial solid particle bed) comprising a sea zone and at least one island zone distributed in said sea zone and having an upper surface, a lower surface, an axial direction (i.e. the length direction or the direction of the material flow in the solid particle bed from said upper surface to said lower surface) and a radial direction (i.e. the cross-sectional direction or the direction perpendicular to said axial direction), wherein said island zone extends (preferably from said upper surface) along the axial direction of said solid particle bed but does not extend to said lower surface and the voidage of said island zone is 110-300% (preferably 130-240%, and further preferably 140-200%) of the voidage of the sea zone.

2. The solid particle bed according to any of the preceding or subsequent aspects, wherein the sea zone extends from the upper surface to the lower surface along the axial direction of the solid particle bed,
and/or,
the at least one island zone is distributed in the sea zone in a manner selected from the group consisting of:
  i) a manner in which the at least one island zone is distributed discretely in the sea zone;
  ii) a manner in which the at least one island zone is arranged in the form of an annulus surrounding a portion of the sea zone;
  iii) a combination of the two manners i) and ii).

3. The solid particle bed according to any of the preceding or subsequent aspects, wherein where the length of any one of the island zone(s) in the axial direction of the solid particle bed is set as Li, the length of the sea zone in the axial direction of the solid particle bed (i.e., the axial length of the solid particle bed) is set as L0, Li/L0<1 (preferably Li/L0≤0.95, more preferably 0.03≤Li/L0≤0.80, most preferably 0.04≤Li/L0≤0.50), and/or the length of all of the island zone(s) in the axial direction of the solid particle bed is substantially the same, and/or, where a maximum of the length(s) of all island zone(s) in the axial direction of the solid particle bed is set as Lmax, Lmax/L0<1 (preferably Lmax/L0=0.95–0.5, more preferably Lmax/L0=0.8–0.5), and/or at least a part of (preferably all of) the island zone(s) extend along the axial direction of the solid particle bed, forming at least one shape selected from the group consisting of columnar shapes and taper shapes (preferably at least one shape selected from the group consisting of cylindrical shapes, prismatic shapes, pyramidal shapes, and conical shapes).

4. The solid particle bed according to any of the preceding or subsequent aspects, wherein where the number of island zone(s) is set as n, n is an integer from 1 to 2000 (preferably an integer from 1 to 200, more preferably an integer from 3 to 50), and/or, in any cross section of the solid particle bed, the island zone(s), being the same as or different from each other, each independently has a cross section that may be in any shape (such as at least one selected from the group consisting of rectangle, circle, ellipse, triangle, parallelogram, ring, and irregular shape), and/or, the total of the island zone(s) accounts for 0.3-57% (preferably 1-40%, more preferably 3-25%) and the sea zone accounts for 43-99.7% (preferably 60-99%, more preferably 75-97%) of the total volume of the solid particle bed.

5. The solid particle bed according to any of the preceding or subsequent aspects, wherein the island zone(s), being the same as or different from each other, each independently has a voidage of 0.20 to 0.90 (preferably 0.30 to 0.80, more preferably 0.33 to 0.70, more preferably 0.37 to 0.60) and/or the sea zone has a voidage of 0.10 to 0.80 (preferably 0.15 to 0.65, more preferably 0.16 to 0.55).

6. The solid particle bed according to any of the preceding or subsequent aspects, wherein in any cross section of the solid particle bed, the straight-line distance between edges of two adjacent island zones is greater than 20 mm (preferably greater than 100 mm) and/or, in any cross section of the solid particle bed, if an island zone is present, the shortest distance between any point in the cross section of the sea zone and an edge of the cross section of an adjacent island zone is no greater than 500 mm (preferably no greater than 300 mm, more preferably no greater than 200 mm, most preferably no greater than 100 mm) and/or, in any cross section of the solid particle bed, the island zone(s), being the same as or different from each other, each independently has a cross-sectional area of no greater than 300000 mm$^2$ (preferably no greater than 100000 mm$^2$) and/or, the solid particle bed has a cross-sectional area of no greater than 3000000 mm$^2$ (preferably no greater than 2000000 mm$^2$) and/or, in any cross section of the solid particle bed, if an island zone is present, the total cross-sectional area of all island zone(s) accounts for 10-60% (preferably 15-45% or 18-30%) of the cross-sectional area of the solid particle bed.

7. The solid particle bed according to any of the preceding or subsequent aspects, wherein the island zone comprises one or more hydrogenation catalysts (referred to as hydrogenation catalyst I), the sea zone comprises one or more hydrogenation catalysts (referred to as hydrogenation catalyst II), and/or the hydrogenation catalyst I is present in the form of hollow and/or toothed particles, the hydrogenation catalyst II is present in the form of porous particles, and/or the hydrogenation catalyst I has a particle size of 2.0-55.0 mm (preferably 3.0-30.0 mm), the hydrogenation catalyst II has a particle size of 0.5-4.0 mm (preferably 0.8-3.0 mm), and/or the hydrogenation catalyst I comprises a carrier and a hydrogenation active metal, the hydrogenation catalyst II is at least one selected from the group consisting of supported catalysts and unsupported catalysts, and the supported catalyst comprises a carrier and a hydrogenation active component, the unsupported catalyst comprises a binder and a hydrogenation active component, and/or the mass content of the hydrogenation active metal, calculated as metal oxide, in the hydrogenation catalyst I (based on the total weight of the hydrogenation catalyst I) is 10-90% (preferably 15-60% or 17-40%) of the mass content of the hydrogenation active component, calculated as metal oxide, in the hydrogenation catalyst II (based on the total weight of the hydrogenation catalyst II), and/or the hydrogenation catalyst(s) I, being the same as or different from each other, each independently has a same or different voidage, and the hydrogenation catalyst(s) II, being the same as or different from each other, each independently has a same or different voidage, with the proviso that the voidage of any one hydrogenation catalyst I is greater than the voidage of any one hydrogenation catalyst II (preferably, the voidage of any one hydrogenation catalyst I is 110-300%, preferably 130-240%, more preferably 140-200% of the voidage of any one hydrogenation catalyst II.

8. The solid particle bed according to any of the preceding or subsequent aspects, wherein in the hydrogenation catalyst I, the hydrogenation active metal is present in an amount of 5-30% (preferably 8-20%) by mass, calculated as metal oxide and based on the total weight of the hydrogenation catalyst, and/or the carrier is at least one selected from the group consisting of activated carbon, inorganic refractory oxides (particularly at least one selected from alumina, silica, magnesia, zirconia and titania) and molecular sieves (particularly at least one selected from alumina and silica), and/or the hydrogenation active metal is at least one selected from the group consisting of Fe, Co, Ni, Cu, Zn, Cr, Mo and W (preferably at least one selected from the group consisting of Fe, Zn, Ni, Co and Cu, more preferably at least one selected from the group consisting of Fe and Ni).

9. The solid particle bed according to any of the preceding or subsequent aspects, wherein in the hydrogenation catalyst II, the hydrogenation active component is present in an amount of 15-40% (preferably between 20-35%) by mass, calculated as metal oxide and based on the total weight of the supported catalyst, and/or the hydrogenation active component is present in an amount of 30-80% (preferably 40-65%) by mass, calculated as metal oxide and based on the total weight of the unsupported catalyst, and/or the carrier is an inorganic refractory oxide (preferably at least one selected from the group consisting of oxides of elements of Group II, Group III, Group IV and Group IVB of the periodic table, more preferably at least one selected from the group consisting of alumina and silica), and/or the binder is an inorganic refractory oxide (preferably at least one selected from the group consisting of oxides of elements of Group II, Group III, Group IV and Group IVB of the periodic table, more preferably at least one selected from the group consisting of alumina and silica), and/or the hydrogenation active component is at least one selected from the group consisting of metals of Groups VIB and VIII of the periodic table (preferably, the Group VIB metal is Mo and/or W and the group VIII metal is Co and/or Ni), and/or, based on the total weight of the supported catalyst, the Group VIB metal is present in an amount of 15-30% (preferably 18-27%) by mass calculated as metal oxide and the Group VIII metal is present in an amount of 2-10% (preferably 3-7%) by mass calculated as metal oxide, and/or, based on the total weight of the unsupported catalyst, the Group VIB metal is present in an amount of 15-30% (preferably 18-27%) by mass calculated as metal oxide, and the Group VIII metal is present in an amount of 2-10% (preferably 3-7%) by mass calculated as metal oxide.

10. A fixed bed, comprising a plurality of sections of solid particle bed, wherein at least one section of the solid particle bed is the solid particle bed according to any of the preceding or subsequent aspects (referred to as solid particle bed A).

11. The fixed bed according to any of the preceding or subsequent aspects, wherein the height of the solid particle bed A is 1-95% (preferably 3-60%, further preferably 4-50%) of the height of the fixed bed.

12. The fixed bed according to any of the preceding or subsequent aspects, further comprising a solid particle bed B located upstream of the solid particle bed A and/or a solid particle bed C located downstream of the solid particle bed A, wherein the voidage of the solid particle bed B is not smaller than the voidage of the island zone in the solid particle bed A, and the voidage of the solid particle bed C is not greater than the voidage of the sea zone in the solid particle bed A.

13. The fixed bed according to any of the preceding or subsequent aspects, wherein the solid particle bed B comprises one or more hydrogenation catalysts B and the solid particle bed C comprises one or more hydrogenation catalysts C, wherein the hydrogenation catalyst B and the hydrogenation catalyst C, being the same or different from each other, are each independently at least one selected from the group consisting of supported catalysts and unsupported catalysts, and the supported catalyst comprises a carrier and a hydrogenation active component, and the unsupported catalyst comprises a binder and a hydrogenation active component (preferably the hydrogenation catalyst B and the hydrogenation catalyst C, being the same or different from each other, are each independently selected from the hydrogenation catalyst II).

14. A process for hydrogenation of oils, comprising a step of passing an oil under hydrogenation conditions through the solid particle bed according to any of the preceding or subsequent aspects or the fixed bed according to any of the preceding or subsequent aspects (referred to as hydrogenation step).

15. The process according to any of the preceding or subsequent aspects, wherein the oil is at least one selected from the group consisting of ethylene pyrolysis gasoline, coker naphtha, catalytic gasoline, fischer-tropsch synthesis oil, coker diesel, catalytic diesel, high dry point straight-run diesel oil, wax oil, residual oil, coal tar, and coal hydrogenation product oil, and/or the hydrogenation conditions include: a reaction temperature of 40-500° C. (preferably 40-450° C.), a reaction pressure of 0.3-20 MPaG (preferably 0.5-15 MPaG), a volume space velocity of 1-10 $h^{-1}$ (preferably 2-10 $h^{-1}$), and a hydrogen-to-oil ratio of 10:1 to 2000:1 (preferably 15:1 to 1000:1).

16. The process according to any of the preceding or subsequent aspects, further comprising, prior to the hydrogenation step, a step of sulfurizing the solid particle bed or the fixed bed, and/or sulfurizing the hydrogenation catalyst off-site in advance, and/or the reaction conditions of the sulfurization include: dry sulfurizing or wet sulfurizing with a sulfurizing agent that is at least one selected from the group consisting of hydrogen sulfide, carbon disulfide, dimethyl disulfide, dimethyl sulfide and di-n-butyl sulfide, a sulfurizing pressure of 1.2-15 MPaG (preferably 1.2-9.4 MPaG), a sulfurizing temperature of 280-400° C. and a sulfurizing time of 4-22 hr.

Technical Effects

According to the present application, in the hydrogenation process of oils containing sediments, impurities in the oil are preferentially deposited at the tail section of the island zone with a relatively larger voidage, and after the deposition of a relatively large amount, the oil mainly enters the sea zone with a relatively smaller voidage through the side of the island zone, so that larger deposition interface area and deposition capacity can be obtained, the increasing of the pressure drop can be slowed down, and meanwhile, a good hydrodesulfurization effect can be maintained.

In the solid particle bed according to the present application, by combining packing areas with a large voidage and packing areas with a small voidage, the oil preferentially enters the packing area with a small voidage through the tail section of the packing area with a large voidage, and as the deposition amount increases, the oil gradually changes its way by entering the packing area with a small voidage through the side of the packing area with a large voidage, so that the adsorption and deposition capacity of sediments can be increased, the increasing of the pressure drop can be slowed down, and meanwhile, a good hydrodesulfurization effect can be maintained.

DETAILED DESCRIPTION OF THE INVENTION

Figure 1:
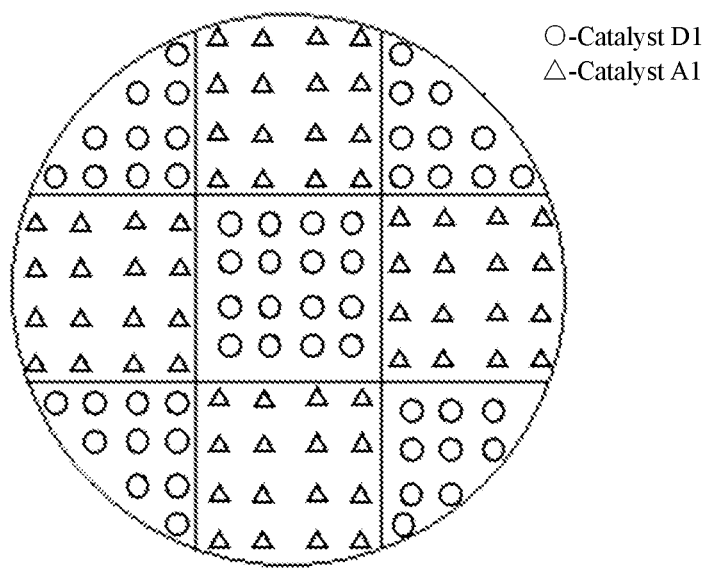
FIG. 1 is a schematic view of the cross section of a reactor with a grading loading of catalyst D1 and catalyst A1 as described in Example 7.

The present application will be illustrated in detail hereinbelow with reference to embodiments thereof, but it should be noted that the scope of the present application is not limited by those embodiments, but is defined by the appended claims.

Where a material, substance, method, step, device, component, or the like is described herein as "commonly known to those skilled in the art", "prior art" or the like, it is to be understood that said material, substance, method, step, device and component cover not only those conventionally used in the art at the time of filing the present application, but also those not commonly used at present but will become commonly known in the art to be suitable for a similar purpose.

When the specification concludes with the claims defining the existence of materials, methods, procedures, means, or components, or the like, that are regarded as being "known to one of ordinary skill in the art", "prior art", or the like, it is intended that the subject matter so derived encompass those materials, methods, procedures, means, or components which have been conventionally used in the art at the time of filing this application, but which may not be so commonly used at the present time, but will become known in the art as being suitable for a similar purpose.

In the context of the present application, unless specifically stated otherwise, all percentages, parts, ratios, etc. are expressed by weight and all pressures given are gauge pressures.

In the context of the present specification, the voidage is measured and calculated by electrical capacitance tomography.

In the context of the present specification, unless specifically stated otherwise, the particle size refers to a volume average particle size, which can typically be measured using a laser method.

In the context of the present application, any two or more embodiments of the present application may be arbitrarily combined, and the resulting technical solution forms a part of the initial disclosure of the present application and falls within the scope of the present application.

The endpoints of any numerical range and any numerical value described in the context of the present application is not restricted to the exact range or value, but should be interpreted to further encompass values close to said range or value. Moreover, regarding any numerical range described herein, arbitrary combinations can be made between the endpoints of the range, between each endpoint and any specific value within the range, or between any two specific values within the range, to provide one or more new numerical range(s), and said new numerical range(s) should also be deemed to have been specifically described in the present application.

According to an embodiment of the present application, it relates to a section of a solid particle bed, particularly a section of an axial solid particle bed. As used herein, the term "section" means that the particle bed constitutes at least one section of the particle bed (typically a fixed bed) packed in a reactor, wherein one or more sections of solid particle bed constitute the whole fixed bed. In addition, the term "axial" means that the direction of material (e.g. reaction material) flowing through the solid particle bed is perpendicular to the cross section of the solid particle bed, or the solid particle bed is packed in the reactor along the axial direction of the reactor, such that the axial direction of the solid particle bed is the same as the axial direction of the reactor and the radial direction of the solid particle bed is the same as the radial direction of the reactor.

According to an embodiment of the present application, the solid particle bed is typically positioned at an inlet end of the reactor, while the remainder of the reactor is packed with a conventional hydrogenation catalyst having desulfurization activity as the circumstances may require. As can be appreciated by those skilled in the art, the inlet end of the reactor refers to the end where the oil enters the reactor, specifically, the inlet end of a co-current reactor refers to the top of the reactor, the inlet end of an upflow reactor refers to the bottom of the reactor, the inlet end of a middle feed reactor and a gas-liquid counter-current reactor refer to the inlet end in the direction of the oil flow, and so on for other reactor types.

According to an embodiment of the present application, the section of the solid particle bed comprises a sea zone and at least one island zone distributed in the sea zone. As used herein, the term "sea zone" typically refers to a region constituting the main body of the solid particle bed as a substantially continuous phase, but does not exclude the case where the sea zone is divided into a plurality of regions by the island zone (such as in the case similar to lagoons). In addition, the term "island zone" typically refers to one or more independent regions present in the sea zone as a discrete material phase, which are separated from each other by a certain distance without connection or communication, and each of which has a definite boundary with the sea zone.

According to an embodiment of the present application, the solid particle bed has an upper surface, a lower surface, an axial direction and a radial direction. As used herein, the axial direction refers to the longitudinal direction or the flow direction of material in the solid particle bed from the upper surface to the lower surface, the radial direction refers to the cross-sectional direction or the direction perpendicular to the axial direction. In addition, the upper surface refers to the surface that the material contacts immediately before entering the solid particle bed, while the lower surface refers to the surface where the material leaves the solid particle bed.

According to an embodiment of the present application, from the viewpoint of obtaining a larger deposition surface area and deposition capacity, the island zone extends along the axial direction of the solid particle bed but does not extend to the lower surface, and preferably the island zone extends from the upper surface along the axial direction of the solid particle bed but does not extend to the lower surface. According to this embodiment, the island zone is preferably exposed on the upper surface of the solid particle bed, but not exposed on the lower surface of the solid particle bed, and its end is embedded in the sea zone. According to this embodiment, the "island" of the present application is present in the form of a floating island in the "sea" zone.

According to an embodiment of the present application, the sea zone extends along the axial direction of the solid particle bed from the upper surface to the lower surface. In other words, it can be observed that the sea zone is exposed on both the upper and lower surfaces of the solid particle bed.

According to an embodiment of the present application, from the viewpoint of obtaining a larger deposition surface area and deposition capacity, where the length of any one of the island zone(s) in the axial direction of the solid particle bed is set as Li and the length of the sea zone in the axial direction of the solid particle bed (i.e., the axial length of the solid particle bed) is set as L0, $Li/L0<1$, preferably $Li/L0 \leq 0.95$, more preferably $0.03 \leq Li/L0 \leq 0.80$, and most preferably $0.04 \leq Li/L0 \leq 0.50$.

According to an embodiment of the present application, from the viewpoint of obtaining a larger deposition surface area and deposition capacity, where a maximum of the length(s) of all island zone(s) in the axial direction of the solid particle bed is set as Lmax, $Lmax/L0<1$, preferably $Lmax/L0=0.95-0.5$, more preferably $Lmax/L0=0.8-0.5$.

According to an embodiment of the present application, from the viewpoint of easy packing of solid particles and the like, all of the island zones have substantially the same length in the axial direction of the solid particle bed.

According to an embodiment of the present application, at least a part of (preferably all of) the island zone(s) extend along the axial direction of the solid particle bed, forming at least one shape selected from the group consisting of columnar shapes and taper shapes. The shape is not particularly limited, and examples thereof include at least one selected from cylindrical shapes, prismatic shapes, pyramidal shapes, and conical shapes.

According to an embodiment of the present application, the voidage of the island zone is 110-300%, preferably 130-240%, and further preferably 140-200%, of the voidage of the sea zone. Due to the difference in voidage, a definite boundary is formed between the island zone and the sea zone. As used herein, the voidage refers to the proportion of the void volume between solid particles to the total volume of the solid particle bed formed after packing the solid particles (typically, catalyst particles) into a reactor.

According to an embodiment of the present application, there is no particular limitation to the distribution manner of the island zones in the sea zone, which may be any manner that can be conceived by those skilled in the art. Preferably, the island zones may be distributed in the sea zone in a manner selected from the group consisting of:
  i) a manner in which the at least one island zone is distributed discretely in the sea zone;
  ii) a manner in which the at least one island zone is arranged in the form of an annulus surrounding a portion of the sea zone;

iii) a combination of the two manners i) and ii).

According to an embodiment of the present application, where the number of the island zones is set as n, n is an integer of 1 to 2000, preferably an integer of 1 to 200, and more preferably an integer of 3 to 50.

According to an embodiment of the present application, in any cross section of the solid particle bed, the island zone(s), being the same as or different from each other, each independently has a cross section of any shape, such as at least one selected from the group consisting of rectangle, circle, ellipse, triangle, parallelogram, ring and irregular shape.

According to an embodiment of the present application, the total of the island zone(s) accounts for 0.3-57%, preferably 1-40%, more preferably 3-25%, of the total volume of the solid particle bed. In addition, the sea zone accounts for 43-99.7%, preferably 60-99%, more preferably 75-97%.

According to an embodiment of the present application, the island zone(s), being the same as or different from each other, each independently has a voidage of 0.20 to 0.90, preferably 0.30 to 0.80, more preferably 0.33 to 0.70, more preferably 0.37 to 0.60.

According to an embodiment of the present application, the sea zone has a voidage of 0.10 to 0.80, preferably 0.15 to 0.65, more preferably 0.16 to 0.55.

According to an embodiment of the present application, to better slow down the increasing of the pressure drop, the sea zone shall be matched with adjacent island zone(s), so that the island zone(s) is sufficient to affect the sea zone. For this reason, to reduce the difficulty in packing and meanwhile ensure a better hydrogenation effect than the prior art, the straight-line distance between edges of two adjacent island zones is greater than 20 mm, preferably greater than 100 mm, in any cross section of the solid particle bed. Alternately, in any cross section of the solid particle bed, if an island zone is present, the shortest distance from any point in the cross section of the sea zone to an edge of the cross section of an adjacent island zone is no greater than 500 mm, preferably no greater than 300 mm, more preferably no greater than 200 mm, most preferably no greater than 100 mm.

According to an embodiment of the present application, in any cross section of the solid particle bed, the island zone(s), being the same as or different from each other, each independently has a cross-sectional area of not greater than 300000 mm$^2$, preferably not greater than 100000 mm$^2$.

According to an embodiment of the present application, the solid particle bed has a cross-sectional area of not greater than 3000000 mm$^2$, preferably not greater than 2000000 mm$^2$.

According to an embodiment of the present application, in any cross section of the solid particle bed, if an island zone is present, the total cross-sectional area of all island zone(s) accounts for 10-60%, preferably 15-45% or 18-30%, of the cross-sectional area of the solid particle bed.

According to an embodiment of the present application, the island zone comprises one or more hydrogenation catalysts (referred to as hydrogenation catalyst I) present as solid particles. Preferably, the island zone is packed with the hydrogenation catalyst I. There is no particular limitation in the present application to the hydrogenation catalyst I, but preferably, the hydrogenation catalyst I comprises a carrier and a hydrogenation active metal.

According to an embodiment of the present application, the hydrogenation catalyst I can be prepared by a method known to those skilled in the art for preparing supported catalysts. More specifically, the catalyst can be obtained by subjecting a carrier material to extrusion molding, drying and calcining, then to impregnation with the hydrogenation active metal, and further to drying and calcining. As a more specific embodiment, the extrusion molding process is carried out by blending an adsorptive porous material with a peptizer, an extrusion aid, and the like, mixing uniformly, and extruding the mixture on a screw extruder or other molding machine to form a carrier in the form of hollow particles, including but not limited to five-hole spheres, six-hole spheres, seven-hole spheres, raschig rings, cylindrical bars with three holes inside, cylindrical bars with five holes inside, round cakes with seven holes inside, and round cakes with nine holes inside; or in the form of toothed particles, including, but not limited to, tridentate spheres, pentadentate spheres, hexadentate spheres, tetradentate bars, pentadentate bars, and the like. The impregnation is preferably isovolumetric impregnation, and the extruded absorptive porous material is impregnated with a stable salt solution of the hydrogenation active metal through isovolumetric impregnation; in the above preparation process, both of the two drying are carried out at 70-150° C. for 1-24 hours, and both of the two calcining are carried out at 300-600° C. for 1-10 hours.

According to an embodiment of the present application, the sea zone comprises one or more hydrogenation catalysts (referred to as hydrogenation catalyst II) present as solid particles. Preferably, the sea zone is packed with the hydrogenation catalyst II. There is no particular limitation in the present application to the hydrogenation catalyst II, which can be a catalyst having desulfurization activity that is well known to those skilled in the art for use in oil hydrogenation, but preferably, the hydrogenation catalyst II is at least one selected from the group consisting of supported catalysts and unsupported catalysts. Here, the supported catalyst comprises a carrier and a hydrogenation active component, and the unsupported catalyst comprises a binder and a hydrogenation active component.

According to an embodiment of the present application, the hydrogenation catalyst II can be easily obtained by those skilled in the art, and as a specific embodiment, the supported catalyst can be obtained by subjecting an inorganic refractory oxide to extrusion molding, drying and calcining, then to impregnation with the hydrogenation active component, and further to drying and calcining to obtain the hydrogenation catalyst component having desulfurization activity. As a more specific embodiment, the extrusion molding process is carried out by blending an adsorptive porous material with the peptizer and extrusion aid uniformly, and extruding the mixture on a screw extruder, preferably to obtain a bar with a circular, oval, clover or four-leaf clover cross section, or spherical particles prepared by rolling ball method, oil-drop method, and the like. The impregnation is preferably equal volume impregnation method, and the extruded carrier is impregnated with a stable salt solution of the hydrogenation active metal through equal volume impregnation method; in the above preparation process, both of the two drying are carried out at 70-150° C. for 1-24 hours, and both of the two calcining are carried out at 300-600° C. for 1-10 hours. The unsupported catalyst is a homogeneous catalyst prepared by methods including, but not limited to, co-precipitation method from the hydrogenation active component and the binder component.

According to an embodiment of the present application, the hydrogenation catalyst I is present in the form of hollow and/or toothed particles. By way of example, hollow particles include, but are not limited to, five-hole spheres, six-hole spheres, seven-hole spheres, raschig rings, cylindrical bars with three holes inside, cylindrical bars with five holes inside, round cakes with seven holes inside, and round cakes with nine holes inside, and the like. By way of example, toothed particles include, but are not limited to, tridentate spheres, pentadentate spheres, hexadentate spheres, tetradentate bars, pentadentate bars, and the like.

According to an embodiment of the present application, from the viewpoint of slowing down the increasing of the pressure drop, the particle size of the hydrogenation catalyst I is typically 2.0 to 55.0 mm, preferably 3.0 to 30.0 mm. In addition, from the viewpoint of slowing down the increasing of the pressure drop, the particle size of the hydrogenation catalyst II is typically 0.5 to 4.0 mm, preferably 0.8 to 3.0 mm.

According to an embodiment of the present application, the hydrogenation catalyst II is present as porous particles.

According to a preferred embodiment of the present application, the hydrogenation catalyst I and the hydrogenation catalyst II are respectively packed in a manner that edges of the columns are in contact with each other, specifically, the two catalysts are packed in an adjacently alternate manner or in an insertion manner. Preferably, the adjacently alternate manner is a packing manner in which the same catalyst is packed into a columnar reaction cell along the material flow direction, and, when viewed from the radial direction, the two different catalysts are packed in every two adjacent columnar reaction cells respectively. Here, the cross section of each columnar reaction cell may be of any shape, and specifically may be of a rectangle, circle, triangle, parallelogram, ring shape or an approximate shape thereof, or any other irregular shape. Moreover, the cross sections of the columnar reaction cells in the same reactor can be the same or different.

According to an embodiment of the present application, the hydrogenation catalyst(s) I, being the same as or different from each other, each independently has a same or different voidage, and the hydrogenation catalyst(s) II, being the same as or different from each other, each independently has a same or different voidage, provided that the voidage of any one of the hydrogenation catalyst(s) I is greater than the voidage of any one of the hydrogenation catalyst(s) II. Preferably, the voidage of any one of the hydrogenation catalyst(s) I is 110-300%, preferably 130-240%, and more preferably 140-200% of the voidage of any one of the hydrogenation catalyst(s) II.

According to an embodiment of the present application, the mass content of the hydrogenation active metal, calculated as metal oxide, in the hydrogenation catalyst I (based on the total weight of the hydrogenation catalyst I) is 10-90%, preferably 15-60% or 17-40% of the mass content of the hydrogenation active component, calculated as metal oxide, in the hydrogenation catalyst II (based on the total weight of the hydrogenation catalyst II).

According to an embodiment of the present application, in the hydrogenation catalyst I, the hydrogenation active metal is present in an amount of 5-30%, preferably 8-20%, by mass, calculated as metal oxide, based on the total weight of the hydrogenation catalyst.

According to an embodiment of the present application, in the hydrogenation catalyst I, the carrier is at least one selected from the group consisting of activated carbon, inorganic refractory oxides and molecular sieves. Here, as the inorganic refractory oxide, those conventionally used in the art may be mentioned, and particularly, it can be at least one selected from the group consisting of alumina, silica, magnesia, zirconia and titania, and more particularly, at least one selected from the group consisting of alumina and silica.

According to an embodiment of the present application, in the hydrogenation catalyst I, the hydrogenation active metal is at least one selected from the group consisting of Fe, Co, Ni, Cu, Zn, Cr, Mo and W, preferably at least one selected from the group consisting of Fe, Zn, Ni, Co and Cu, more preferably at least one selected from Fe and Ni.

According to an embodiment of the present application, in the hydrogenation catalyst II, the hydrogenation active component is present in an amount of 15-40%, preferably 20-35%, by mass, calculated as metal oxide and based on the total weight of the supported catalyst.

According to an embodiment of the present application, in the hydrogenation catalyst II, the hydrogenation active component is present in an amount of 30-80%, preferably 40-65%, by mass, calculated as metal oxide and based on the total weight of the unsupported catalyst.

According to an embodiment of the present application, in the hydrogenation catalyst II, the carrier is an inorganic refractory oxide, preferably at least one selected from oxides of elements of Groups II, III, IV and IVB of the periodic table, more preferably at least one selected from alumina and silica.

According to an embodiment of the present application, in the hydrogenation catalyst II, the binder is an inorganic refractory oxide, preferably at least one selected from oxides of elements of Groups II, III, IV and IVB of the periodic table, more preferably at least one selected from alumina and silica.

According to an embodiment of the present application, in the hydrogenation catalyst II, the hydrogenation active component is at least one selected from the group consisting of Group VIB metals and Group VIII metals, preferably, the Group VIB metal is Mo and/or W, and the Group VIII metal is Co and/or Ni.

According to an embodiment of the present application, in the hydrogenation catalyst II, the Group VIB metal is present in an amount of 15-30%, preferably 18-27%, by mass, calculated as metal oxide, and the Group VIII metal is present in an amount of 2-10%, preferably 3-7%, by mass, calculated as metal oxide, based on the total weight of the supported catalyst.

According to an embodiment of the present application, in the hydrogenation catalyst II, the Group VIB metal is present in an amount of 15-30%, preferably 18-27%, by mass, calculated as metal oxide, and the Group VIII metal is present in an amount of 2-10%, preferably 3-7%, by mass, calculated as metal oxide, based on the total weight of the unsupported catalyst.

According to an embodiment of the present application, in the hydrogenation catalyst I or the hydrogenation catalyst II, the carrier or the binder may be modified, such as with a modifying element such as B, P, F. Here, the modifying element is typically present in an amount of 0.8-8 wt %, based on the weight of the modified carrier or binder.

According to an embodiment of the present application, there is no particular limitation to the method for producing the solid particle bed (i.e., the method for packing the solid particles), and typically, those skilled in the art can find a packing method to realize the catalyst grading scheme of the present application. Particularly, those skilled in the art can use any of the following embodiments, which are only used to illustrate the implementation of the technical solution of the present application, which is not limited to the following embodiments.

One packing method comprises: packing solid particles outside a reactor into a designed geometric shape in advance and then moving it into the reactor according to a predesigned catalyst grading scheme; in which the specific operation involves preforming the solid particles into the designed geometric shape in a mold having a certain geometric shape.

Another packing method comprises: partitioning the interior of a reactor into a designed geometric shape by a mesh, and then packing, in which the mesh used does not affect the contact of adjacent solid particles.

Still another packing method comprises: directly packing the reactor by packing a certain solid particle into a designed geometric shape, in which a partition plate can be used temporarily and locally when packing the sea zone or the island zone.

According to an embodiment of the present application, it also relates to a fixed bed comprising a plurality of sections of solid particle bed (or a plurality of solid particle bed sections), wherein at least one section of solid particle bed is the solid particle bed according to the present application (referred to as solid particle bed A).

According to an embodiment of the present application, the height of the solid particle bed A is 1-95%, preferably 3-60%, and more preferably 4-50% of the height of the fixed bed.

According to an embodiment of the present application, the fixed bed further comprises a solid particle bed B positioned upstream of the solid particle bed A, wherein the voidage of the solid particle bed B is not smaller than the voidage of the island zones in the solid particle bed A. Here, the solid particle bed B comprises or is packed with one or more hydrogenation catalysts B.

According to an embodiment of the present application, the fixed bed further comprises a solid particle bed C positioned downstream of the solid particle bed A, wherein the voidage of the solid particle bed C is not greater than the voidage of the sea zone in the solid particle bed A. Here, the solid particle bed C comprises or is packed with one or more hydrogenation catalysts C.

According to an embodiment of the present application, the hydrogenation catalyst B and the hydrogenation catalyst C are the same as or different from each other, and is each independently at least one selected from the group consisting of supported catalysts and unsupported catalysts. Here, the supported catalyst comprises a carrier and a hydrogenation active component, and the unsupported catalyst comprises a binder and a hydrogenation active component. Preferably, the hydrogenation catalyst B and the hydrogenation catalyst C are the same as or different from each other, and is each independently selected from the hydrogenation catalyst(s) II.

According to an embodiment of the present application, it further relates to a process for hydrogenation of oils, comprising a step of passing an oil through the solid particle bed of the present application or the fixed bed of the present application under hydrogenation conditions (referred to as hydrogenation step).

As can be appreciated by those skilled in the art, the process for hydrogenation of oils of the present application is suitable for treating any oil feedstock, and is particularly suitable for oils comprising sediments. Here, the feedstock includes, but is not limited to, ethylene pyrolysis gasoline, coker naphtha, catalytic gasoline, fischer-tropsch synthesis oil, coker diesel, catalytic diesel, high dry point straight-run diesel oil, wax oil, residual oil, coal tar, coal hydrogenation product oil, and the like. Most of these feedstocks comprise impurities such as sulfur, nitrogen, oxygen, olefins, aromatics, and the like, and hydrofining is normally required to remove the impurities before use. During the hydrofining of these feedstocks, a phenomenon often occurs in which the pressure drop across the reactor increases, resulting in a reduction in the operating cycle. The increase of the pressure drop is partially resulted from the accumulation of impurities, such as: the deposition of coke powder and other solid matters in the feedstock, the condensation, dehydrogenation and coking of unsaturated components in the feedstock, and the accumulation of metal ions caused by the corrosion of upstream pipeline and container. These impurities gradually clog the voids in the catalyst bed, resulting in a decrease in the voidage, and in turn causing an increase in pressure drop and affecting operating cycle of the reactor.

Without being bound by any theory, the inventors of the present application believe that the sediments can easily pass through the catalyst bed with a larger voidage, and when arriving at the catalyst portion with a smaller voidage, the materials are easy to be deposited by adsorption and eventually deposited primarily on the catalyst with a smaller voidage. Current technology for slowing down the increase of pressure drop mainly involves packing a catalyst with a larger voidage in the inlet section of a reactor, so that the sediments are deposited gradually, and the deposition area is only the cross-sectional area of the reactor. According to the present application, the sediments mainly pass through the island zone (such as a columnar reaction cell packed with the hydrogenation catalyst I) with a larger voidage, and are first deposited on the bottom of the island zone (the bottom here refers to the end of the material flow direction). When the deposition amount is increased to a certain degree that causes a clog of the bottom, the sediments flow radially from the side of the island zone to the sea zone (such as a columnar reaction cell packed with a hydrogenation catalyst II) with a smaller voidage, so that the deposition area can be increased, and the increasing rate of the pressure drop can be reduced.

According to an embodiment of the present application, the hydrogenation conditions include: a reaction temperature of 40-500° C., preferably 40-450° C., a reaction pressure of 0.3-20 MPaG, preferably 0.5-15 MPaG, a volume space velocity of 1-10 $h^{-1}$, preferably 2-10 $h^{-1}$, and a hydrogen-to-oil ratio of 10:1 to 2000:1, preferably 15:1 to 1000:1.

According to an embodiment of the present application, the process for hydrogenation of oils further comprises a step of sulfurizing the solid particle bed or the fixed bed prior to the hydrogenation step. Alternately, the hydrogenation catalyst may be subjected to sulfurization outside the reactor in advance. Here, the reaction conditions of the sulfurization include: dry sulfurizing or wet sulfurizing with a sulfurizing agent that is at least one selected from the group consisting of hydrogen sulfide, carbon disulfide, dimethyl disulfide, dimethyl sulfide and di-n-butyl sulfide, a sulfurizing pressure of 1.2-15 MPaG (preferably 1.2-9.4 MPaG), a sulfurizing temperature of 280-400° C. and a sulfurizing time of 4-22 hr.

EXAMPLES

The present application will be further illustrated in detail with reference to the following examples and comparative examples, but the present application is not limited to those examples.

In Examples 1 to 17, hydrogenation catalysts II D1-D17 having a high desulfurization activity and a relatively smaller voidage were prepared.

Example 1

Preparation of Hydrogenation Catalyst D1:

1000 g of macroporous aluminum hydroxide was taken, and nitric acid and water were added thereto, to obtain a pasty mixture with a $HNO_3$ content of 1.5% and a water content of 60%. The mixture was extruded on a screw extruder to obtain clover-shaped bars with a diameter of 1.5 mm and a particle size of 1.5 mm, the clover-shaped bars were dried for 2 hours at 100° C., then the mixture was calcined for 8 hours at 560° C. to obtain a carrier. Ammonium heptamolybdate and nickel nitrate were formulated into an aqueous solution, the carrier was subjected to isovolumetric impregnation with the aqueous solution for 30 minutes to obtain wet bars with 24% of molybdenum oxide and 4% of nickel oxide (calculated on dry basis after calcining), which were dried for 2 hours at 100° C., and then calcined for 2 hours at 560° C. to obtain a catalyst D1.

The voidage of the bed of catalyst D1 was determined to be 0.24.

Example 2

Preparation of Hydrogenation Catalyst D2:

1000 g of macroporous amorphous silica-alumina was taken, nitric acid and water were added thereto, to obtain a pasty mixture with a $HNO_3$ content of 1.7% and a water content of 63%. The mixture was extruded on a screw extruder to obtain clover-shaped bars with a diameter of 1.8 mm and a particle size of 2.8 mm, the clover-shaped bars were dried at 80° C. for 18 hours, then calcined at 540° C. for 4 hours to obtain a carrier. Ammonium heptamolybdate and nickel nitrate were formulated into an aqueous solution, the carrier was subjected to isovolumetric impregnation with the aqueous solution for 30 minutes to obtain wet bars with 27% of molybdenum oxide and 5% of nickel oxide (calculated on dry basis after calcining), which were dried at 100° C. for 2 hours, and then calcined at 540° C. for 4 hours to obtain a catalyst D2.

The voidage of the bed of catalyst D2 was determined to be 0.36.

Example 3

Preparation of Hydrogenation Catalyst D3:

1000 g of aluminum hydroxide containing 0.9% of fluorine was taken, nitric acid and water were added thereto, to obtain a pasty mixture with a $HNO_3$ content of 1.5% and a water content of 60%. The mixture was extruded on a screw extruder to obtain clover-shaped columnar bars with a diameter of 1.5 mm and a particle size of 1.7 mm, the clover-shaped columnar bars were dried at 120° C. for 6 hours, then calcined at 550° C. for 5 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 550° C. for 3 hours to obtain a catalyst D3.

The voidage of the bed of catalyst D3 was determined to be 0.28.

Example 4

Preparation of Hydrogenation Catalyst D4:

1000 g of macroporous alumina containing 2% of silica was taken, nitric acid and water were added thereto, to obtain a pasty mixture with a $HNO_3$ content of 1.3% and a water content of 53%. The mixture was extruded on a screw extruder to obtain cylindrical bars with a diameter of 1 mm and a particle size of 0.6, the cylindrical bars were dried for 8 hours at 150° C., then calcined for 10 hours at 600° C. to obtain a carrier. Ferric nitrate and ammonium metatungstate were formulated into an aqueous solution, the carrier was subjected to isovolumetric impregnation with the aqueous solution for 30 minutes to obtain wet bars with 5% of iron oxide and 18% of tungsten oxide (calculated on dry basis after calcining), which were dried for 2 hours at 130° C., and then calcined for 8 hours at 600° C. to obtain a catalyst D4.

The voidage of the bed of catalyst D4 was determined to be 0.13.

Example 5

Preparation of Hydrogenation Catalyst D5:

1000 g of macroporous aluminum hydride was taken, nitric acid and water were added thereto, to obtain a pasty mixture with a $HNO_3$ content of 2% and a water content of 67%. The mixture was extruded on a screw extruder to obtain clover-shaped columnar bars with a diameter of 2 mm and a particle size of 3 mm, the clover-shaped columnar bars were dried at 100° C. for 4 hours, then were calcined at 520° C. for 3 hours to obtain a carrier. Ammonium heptamolybdate and nickel nitrate were formulated into an aqueous solution, the carrier was subjected to isovolumetric impregnation with the aqueous solution for 30 minutes to obtain wet bars with 5% of nickel oxide and 20% of molybdenum oxide (calculated on dry basis after calcining), which were dried at 100° C. for 2 hours, and then calcined at 520° C. for 3 hours to obtain a catalyst D5.

The voidage of the bed of catalyst D5 was determined to be 0.41.

Example 6

Preparation of Hydrogenation Catalyst D6:

Catalyst D6, having an iron oxide content of 28% (calculated on dry basis after calcining), was prepared in the same matter as described for D1, except that the impregnating metal was changed to ferric nitrate. The voidage of the bed of catalyst D6 was 0.24.

Example 7

Preparation of Hydrogenation Catalyst D7:

1000 g of aluminum hydroxide containing 0.9% of fluorine was taken, nitric acid and water were added thereto, to obtain a pasty mixture with a $HNO_3$ content of 1.5% and a water content of 56%. The mixture was shaped to obtain spheres with a diameter of 2.0 mm, the spheres were dried at 120° C. for 6 hours, then calcined at 580° C. for 10 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 580° C. for 3 hours to obtain a catalyst D7.

The voidage of the bed of catalyst D7 was determined to be 0.22.

Example 8

Preparation of Hydrogenation Catalyst D8:

1000 g of aluminum hydroxide containing 0.9% of fluorine was taken, nitric acid and water were added thereto, to obtain a pasty mixture with a $HNO_3$ content of 2.3% and a water content of 70%. The mixture was extruded on a screw extruder to obtain clover-shaped columnar bars with a diameter of 1.5 mm and a particle size of 3.5 mm, the clover-shaped columnar bars were dried for 6 hours at 100° C., then calcined for 5 hours at 500° C. to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried for 2 hours at 100° C., and then calcined for 3 hours at 500° C. to obtain a catalyst D8.

The voidage of the bed of catalyst D8 was determined to be 0.46.

Example 9

Preparation of Hydrogenation Catalyst D9:

1000 g of aluminum hydroxide containing 0.9% of fluorine was taken, nitric acid and water were added thereto, to obtain a pasty mixture with a $HNO_3$ content of 1.8% and a water content of 60%. The mixture was extruded on a screw extruder to obtain clover-shaped columnar bars with a diameter of 1.5 mm and a particle size of 2, the clover-shaped columnar bars were dried at 100° C. for 5 hours, then calcined at 550° C. for 2 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 530° C. for 3 hours to obtain a catalyst D9.

The voidage of the bed of catalyst D9 was determined to be 0.31.

Example 10

Preparation of Hydrogenation Catalyst D10:

1000 g of macroporous alumina containing 2% of silica was taken, nitric acid and water were added thereto, to obtain a pasty mixture with a $HNO_3$ content of 1.5% and a water content of 61%. The mixture was extruded on a screw extruder to obtain clover-shaped columnar bars with a diameter of 1.5 mm and a particle size of 1.6 mm, the clover-shaped columnar bars were dried at 110° C. for 5 hours, then calcined at 550° C. for 2 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 550° C. for 3 hours to obtain a catalyst D10.

The voidage of the bed of catalyst D10 was determined to be 0.29.

Example 11

Preparation of Hydrogenation Catalyst D11:

1000 g of macroporous alumina containing 2% of silica was taken, nitric acid and water were added thereto, to obtain a pasty mixture with a $HNO_3$ content of 1.8% and a water content of 60%. The mixture was extruded on a screw extruder to obtain clover-shaped columnar bars with a diameter of 1.5 mm and a particle size of 2.5 mm, the clover-shaped columnar bars were dried at 120° C. for 3 hours, then calcined at 550° C. for 2 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 510° C. for 3 hours to obtain a catalyst D11.

The voidage of the bed of catalyst D11 was determined to be 0.32.

Example 12

Preparation of Hydrogenation Catalyst D12:

1000 g of macroporous alumina containing 2% of silica was taken, nitric acid and water were added thereto, to obtain a pasty mixture with a $HNO_3$ content of 1.9% and a water content of 70%. The mixture was extruded on a screw extruder to obtain clover-shaped columnar bars with a diameter of 1.5 mm and a particle size of 3.2 mm, the clover-shaped columnar bars were dried at 100° C. for 7 hours, then calcined at 530° C. for 3 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 7 hours, and then calcined at 530° C. for 3 hours to obtain a catalyst D12.

The voidage of the bed of catalyst D12 was determined to be 0.40.

Example 13

Preparation of Hydrogenation Catalyst D13:

1000 g of microporous alumina containing 5% of zirconia was taken, nitric acid and water were added thereto, to obtain a pasty mixture with a $HNO_3$ content of 1.5% and a water content of 73%. The mixture was extruded on a screw extruder to obtain four-leaf clover shaped columnar bars with a diameter of 1.5 mm and a particle size of 4 mm, the four-leaf clover shaped columnar bars were dried at 130° C. for 6 hours, then calcined at 500° C. for 8 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 480° C. for 3 hours to obtain a catalyst D13.

The voidage of the bed of catalyst D13 was determined to be 0.40.

Example 14

Preparation of Hydrogenation Catalyst D14:

1000 g of macroporous alumina was taken, nitric acid and water were added thereto, to obtain a pasty mixture with a $HNO_3$ content of 1.5% and a water content of 60%. The mixture was extruded on a screw extruder to obtain cylindrical bars with a diameter of 1.5 mm and a particle size of 2.8 mm, the cylindrical bars were dried at 120° C. for 6 hours, then calcined at 560° C. for 3 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 560° C. for 3 hours to obtain a catalyst D14.

The voidage of the bed of catalyst D14 was determined to be 0.27.

Example 15

Preparation of Hydrogenation Catalyst D15:

1000 g of macroporous alumina containing 2% of silica was taken, nitric acid and water were added thereto, to obtain a pasty mixture with a $HNO_3$ content of 2.1% and a water content of 70%. The mixture was extruded on a screw extruder to obtain cylindrical bars with a diameter of 3 mm and a particle size of 3.6 mm, the cylindrical bars were dried at 120° C. for 5 hours, then calcined at 510° C. for 2 hours to obtain a carrier. Ammonium heptamolybdate and cobalt nitrate were formulated into an aqueous solution, the carrier was subjected to isovolumetric impregnation with the aqueous solution for 30 minutes to obtain wet bars with 16% of molybdenum oxide and 3% of cobalt oxide (calculated on dry basis after calcining), which were dried at 100° C. for 2 hours, and then calcined at 510° C. for 3 hours to obtain a catalyst D15.

The voidage of the bed of catalyst D15 was determined to be 0.44.

Example 16

Preparation of Hydrogenation Catalyst D16:

1000 g of microporous aluminum hydroxide containing 1.0% of fluorine was taken, nitric acid and water were added thereto, to obtain a pasty mixture with a $HNO_3$ content of 1.5% and a water content of 73%. The mixture was shaped to obtain four-leaf clover shaped bars with a diameter of 2 mm and a particle size of 4 mm, the four-leaf clover shaped bars were dried for 5 hours at 130° C., then calcined for 7 hours at 460° C. to obtain a carrier. Ammonium heptamolybdate and nickel nitrate were formulated into an aqueous solution, the carrier was subjected to isovolumetric impregnation with the aqueous solution for 30 minutes to obtain wet bars with 5% of nickel oxide and 20% of molybdenum oxide (calculated on dry basis after calcining), which were dried for 2 hours at 100° C., and then calcined for 3 hours at 380° C. to obtain a catalyst D16.

The voidage of the bed of catalyst D16 was determined to be 0.56.

Example 17

Preparation of Hydrogenation Catalyst D17:

1000 g of macroporous aluminum hydroxide was taken, nitric acid and water were added thereto, to obtain a pasty mixture with a $HNO_3$ content of 1.5% and a water content of 50%. The mixture was extruded on a screw extruder to obtain cylindrical bars with a diameter of 1 mm and a particle size of 1 mm, the cylindrical bars were dried at 150° C. for 2 hours, then calcined at 600° C. for 6 hours to obtain a carrier. Ammonium heptamolybdate and nickel nitrate were formulated into an aqueous solution, the carrier was subjected to isovolumetric impregnation with the aqueous solution for 30 minutes to obtain wet bars with 5% of nickel oxide and 20% of molybdenum oxide (calculated on dry basis after calcining), which were dried at 100° C. for 2 hours, and then calcined at 550° C. for 3 hours to obtain a catalyst D17.

The voidage of the bed of catalyst D17 was determined to be 0.19.

In Examples 18-25, hydrogenation catalysts I A1-A8 having a relatively large voidage were prepared:

Example 18

Preparation of Hydrogenation Catalyst A1:

1000 g of microporous aluminum hydroxide was taken, nitric acid and water were added thereto, to obtain a pasty mixture with a $HNO_3$ content of 2.8% and a water content of 80%. The mixture was extruded on a screw extruder to obtain hollow cylindrical bars with a diameter of 6 mm and a particle size of 9 mm, with the diameter of the hollow part being 3 mm, the hollow cylindrical bars were dried at 100° C. for 2 hours, and then calcined at 500° C. for 5 hours to obtain a carrier. Nickel nitrate was formulated into an aqueous solution, the carrier was subjected to isovolumetric impregnation with the aqueous solution for 30 minutes to obtain wet bars with 5% of nickel oxide (calculated on dry basis after calcining), which were dried at 100° C. for 2 hours, and then calcined at 500° C. for 2 hours to obtain a catalyst A1.

According to the measurement, the voidage of the bed of catalyst A1 was 0.56 and its total metal oxide content was 17.9% of that of the corresponding catalyst D1.

Example 19

Preparation of Hydrogenation Catalyst A2:

1000 g of microporous amorphous silica-alumina was taken, nitric acid and water were added thereto, to obtain a mixture with a $HNO_3$ content of 1.5% and a water content of 65%. The mixture was shaped to obtain five-tooth spheres with a diameter of 5 mm, the spheres were dried at 70° C. for 20 hours, and then calcined at 580° C. for 9 hours to obtain a carrier. Ferric nitrate was formulated into an aqueous solution, the carrier was subjected to isovolumetric impregnation with the aqueous solution for 30 minutes to obtain wet bars with 4% of ferric oxide (calculated on dry basis after calcining), which were dried at 100° C. for 2 hours, and then calcined at 580° C. for 8 hours to obtain a catalyst A2.

According to the measurement, the voidage of the bed of catalyst A2 was 0.46 and its total metal oxide content was 12.5% of that of the corresponding catalyst D2.

Example 20

Preparation of Hydrogenation Catalyst A3:

1000 g of microporous aluminum hydroxide containing 3% of silica was taken, nitric acid and water were added thereto, to obtain a pasty mixture with a $HNO_3$ content of 2.5% and a water content of 80%. The mixture was pressed on a tablet press to obtain nine-hole round cakes having a diameter of 12 mm and a height of 6 mm, with the inner diameter being 1.5 mm, the round cakes were dried at 130° C. for 6 hours, and then calcined at 540° C. for 7 hours to obtain a carrier. Ferric nitrate was formulated into an aqueous solution, the carrier was subjected to isovolumetric impregnation with the aqueous solution for 30 minutes to obtain wet bars with 6% of ferric oxide (calculated on dry basis after calcining), which were dried at 100° C. for 2 hours, and then calcined at 540° C. for 6 hours to obtain a catalyst A3.

According to the measurement, the voidage of the bed of catalyst A3 was 0.63, and its total metal oxide content was 31.6% of that of the corresponding catalyst D3.

Example 21

Preparation of Hydrogenation Catalyst A4:

1000 g of microporous aluminum hydroxide containing 3% of B was taken, nitric acid and water were added thereto, to obtain a pasty mixture with a $HNO_3$ content of 1.1% and a water content of 53%. The mixture was extruded on a screw extruder to obtain tridentate bars with a diameter of 1 mm and a particle size of 2 mm, the tridentate bars were dried at 150° C. for 2 hours, and then the tridentate bars were calcined at 600° C. for 10 hours to obtain a carrier. Cobalt nitrate was formulated into an aqueous solution, the carrier was subjected to isovolumetric impregnation with the aqueous solution for 30 minutes to obtain wet bars with 3% of cobalt oxide (calculated on dry basis after calcining), which were dried for 2 hours at 150° C., and then calcined for 3 hours at 600° C. to obtain a catalyst A4.

According to the measurement, the voidage of the bed of catalyst A4 was 0.23 and its total metal oxide content was 13% of that of the corresponding catalyst D4.

Example 22

Preparation of Hydrogenation Catalyst A5:

1000 g of micropores amorphous silica-alumina was taken, nitric acid and water were added thereto, to obtain a mixture with a $HNO_3$ content of 1.7% and a water content of 74%. The mixture was pressed on a tablet press to obtain seven-hole round cakes with a diameter of 8 mm and a particle size of 5 mm, with the inner diameter being 1 mm, the round cakes were dried for 5 hours at 90° C., and then calcined for 9 hours at 560° C. to obtain a carrier. Nickel nitrate was formulated into an aqueous solution, the carrier was subjected to isovolumetric impregnation with the aqueous solution for 30 minutes to obtain wet bars with 10% of nickel oxide (calculated on dry basis after calcining), which were dried at 90° C. for 2 hours, and then calcined at 560° C. for 8 hours to obtain a catalyst A5.

According to the measurement, the voidage of the bed of catalyst A5 was 0.59 and its total metal oxide content was 40% of that of the corresponding catalyst D5.

Example 23

Preparation of Hydrogenation Catalyst A6:

1000 g of microporous alumina was taken, nitric acid and water were added thereto, to obtain a mixture with a $HNO_3$ content of 2.3% and a water content of 76%. The mixture was extruded on a screw extruder to obtain cylindrical bars with seven holes inside having a diameter of 15 mm and a particle size of 20 mm, with the inner diameter being 2 mm, the cylindrical bars were dried at 130° C. for 12 hours, and then calcined at 520° C. for 8 hours to obtain a carrier. Ferric nitrate was formulated into an aqueous solution, the carrier was subjected to isovolumetric impregnation with the aqueous solution for 30 minutes to obtain wet bars with 20% of ferric oxide (calculated on dry basis after calcining), which were dried at 130° C. for 6 hours, and then calcined at 520° C. for 6 hours to obtain a catalyst A6.

According to the measurement, the voidage of the bed of catalyst A6 was 0.65 and its total metal oxide content was 71.4% of that of the corresponding catalyst D1.

Example 24

Preparation of Hydrogenation Catalyst A7:

1000 g of microporous aluminum hydroxide with 3% of titania was taken, nitric acid and water were added thereto, to obtain a pasty mixture with a $HNO_3$ content of 2.6% and a water content of 85%. The mixture was extruded on a screw extruder to obtain honeycomb bars with a diameter of 20 mm and a particle size of 46 mm, with 32 square grids uniformly distributed inside the honeycomb bars, the honeycomb bars were dried for 3 hours at 100° C., and then calcined for 9 hours at 450° C. to obtain a carrier. Zinc nitrate was formulated into an aqueous solution, the carrier was subjected to isovolumetric impregnation with the aqueous solution for 30 minutes to obtain wet bars with 16% of zinc oxide (calculated on dry basis after calcining), which were dried at 120° C. for 3 hours, and then calcined at 380° C. for 4 hours to obtain a catalyst A7.

According to the measurement, the voidage of the bed of catalyst A7 was 0.8 and its total metal oxide content was 84.2% of that of the corresponding catalyst D3.

Example 25

Preparation of Hydrogenation Catalyst A8:

Catalyst A8 having 16% of molybdenum oxide and 4% of nickel oxide (calculated on dry basis after calcining) was prepared in the same manner as described for A6, except that the impregnating metals were changed to nickel nitrate and ammonium heptamolybdate. According to the measurement, the voidage of the bed of catalyst A8 was 0.65 and its total metal oxide content was 71.4% of that of the corresponding catalyst D6.

Example 26

Catalyst D1 and Catalyst A1 were Loading into a Cylindrical Hydrogenation Reactor:

The reactor was a co-current reactor, in which oils to be hydrogenated and hydrogen were introduced into the upper part of the reactor, and the reaction effluent was withdrawn from the lower part thereof. In the packing, the catalyst D1 with a higher desulfurization activity was first uniformly packed in the lower part of the reactor, so that the catalyst bed formed accounted for 70% of the height of the reactor; then the catalyst D1 and the catalyst A1 were packed in the upper grading packing section in accordance with the scheme of the present application. For the grading packing section, as viewed in cross section, the reactor was divided by intersecting transverse and longitudinal lines into a plurality of square, approximately square and approximately triangular spaces, in which the catalyst D1 and the catalyst A1 were packed alternately as shown in FIG. 1.

In this example, the voidage of the island zone was 233.3% of the voidage of the sea zone, Li/L0=0.3, the number of island zones was 30, the shortest distance from any point in the cross section of the sea zone to an edge of the cross section of an adjacent island zone was not greater than 120 mm, the particle size of the hydrogenation catalyst I was 9 mm, and the particle size of the hydrogenation catalyst II was 1.5 mm.

Example 27

Figure 2:
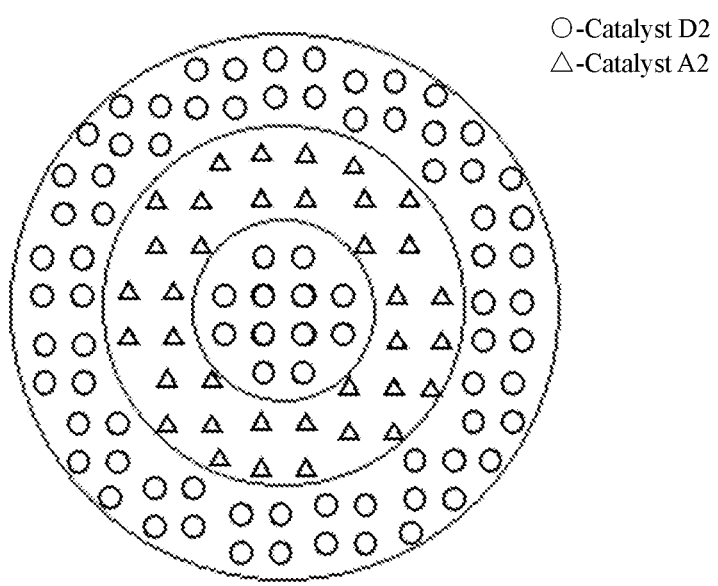
FIG. 2 is a schematic view of the cross section of a reactor with a grading loading of catalyst D2 and catalyst A2 as described in Example 8.

Catalyst D2 and Catalyst A2 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D2 and the catalyst A2 were first packed in the lower part of the reactor in accordance with the grading loading scheme of the present application, in which, as viewed in cross section, the reactor was divided into a plurality of concentric rings, and the spaces of every two adjacent rings were packed with the catalyst D2 and the catalyst A2 alternately, as shown in FIG. 2. The thickness of each concentric ring was 20 mm. The height of the catalyst bed of the grading packing section accounted for 40% of the total height of the catalyst bed in the reactor. Catalyst D2 was then uniformly packed over the graded catalyst bed.

In this example, the voidage of the island zone was 127.3% of the voidage of the sea zone, $Li/L0=0.4$, the number of island zones was 20, the shortest distance from any point in the cross section of the sea zone to an edge of the cross section of an adjacent island zone was not greater than 10 mm, the particle size of the hydrogenation catalyst I was 5 mm, and the particle size of the hydrogenation catalyst II was 2.8 mm.

Example 28

Figure 3:
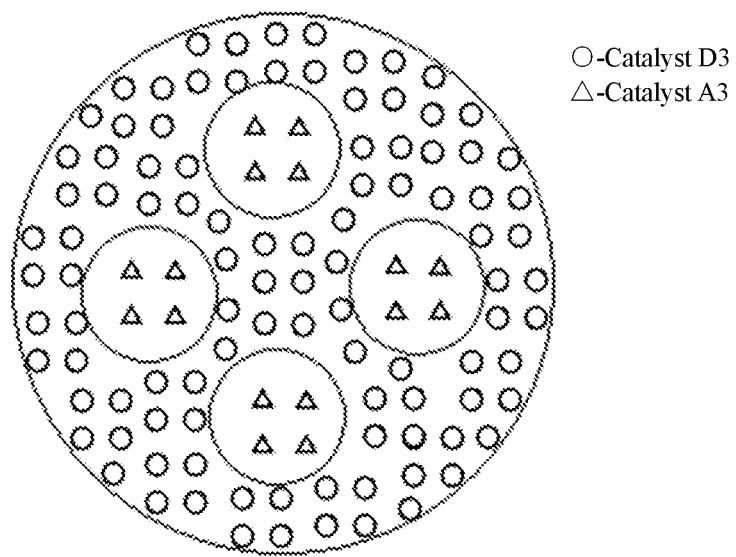
FIG. 3 is a schematic view of the cross section of a reactor with a grading loading of catalyst D3 and catalyst A3 as described in Example 9.
Figure 4:
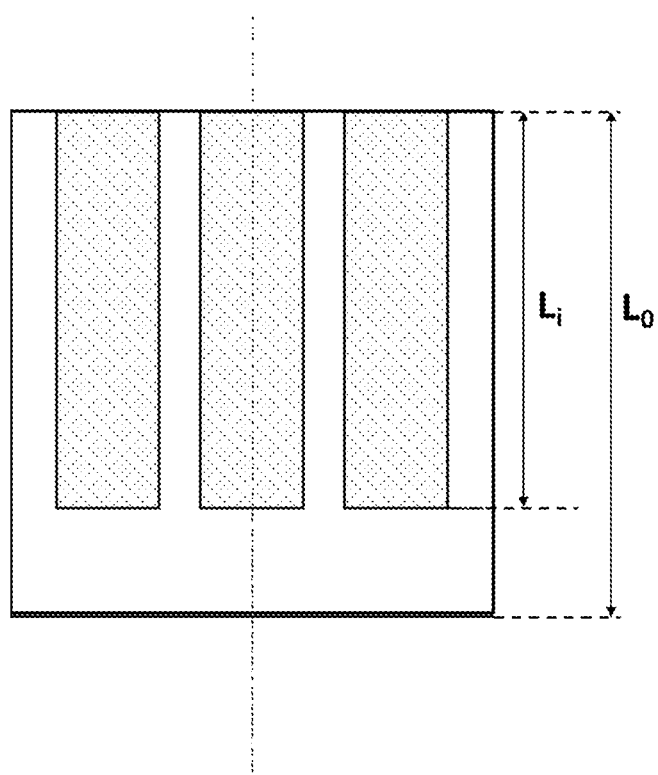
FIG. 4 schematically illustrates the Li and L0 for a solid particle bed.
Figure 5:
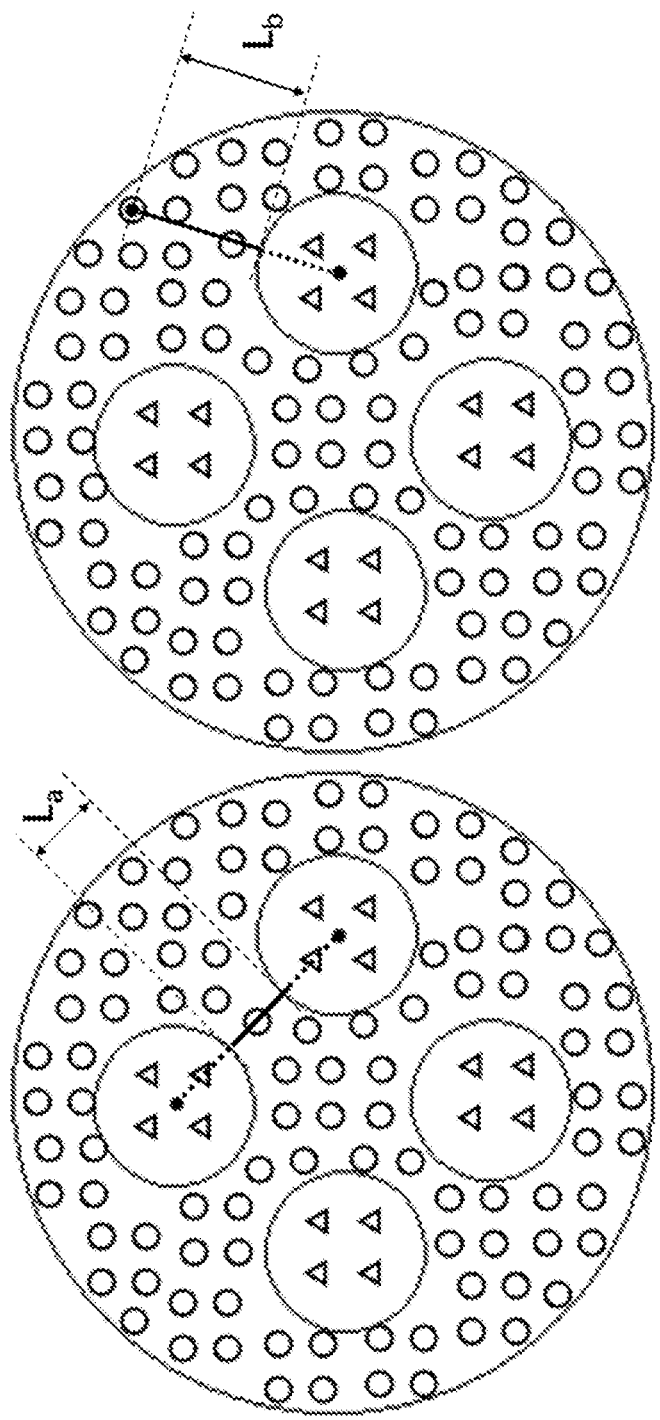
FIG. 5 schematically illustrates, in any cross section of the solid particle bed, the straight-line distance La between the edges of two adjacent island zones, and the shortest distance Lb between any point in the cross section of the sea zone and an edge of the cross section of an adjacent island zone.

Catalyst D3 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D3 and the catalyst A3 were first packed in the lower part of the reactor in accordance with the grading loading scheme of the present application, and as viewed in cross section, 18 cylinders were uniformly distributed in the reactor, with each cylinder having a diameter of 30 mm, the catalyst A3 was packed in the cylinders, and the rest part was packed with the catalyst D3, as shown in FIG. 3. The height of the catalyst bed of the grading packing section accounted for 60% of the total height of the catalyst bed in the reactor. Catalyst D3 was then uniformly packed over the graded catalyst bed.

In this example, the voidage of the island zone was 225.0% of the voidage of the sea zone, $Li/L0=0.6$, the number of island zones was 18, the shortest distance from any point in the cross section of the sea zone to an edge of the cross section of an adjacent island zone was not greater than 60 mm, the particle size of the hydrogenation catalyst I was 6 mm, and the particle size of the hydrogenation catalyst II was 1.7 mm.

Example 29

Catalyst D4 and Catalyst A4 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D4 and the catalyst A4 were first packed in the lower part of the reactor in accordance with the grading loading scheme of the present application, and as viewed in cross section, 55 cylinders were uniformly distributed in the reactor, with each cylinder having a diameter of 30 mm, the catalyst A4 was packed in the cylinders, and the rest part was packed with the catalyst D4, similar to that shown in FIG. 3. The height of the catalyst bed of the grading packing section accounted for 75% of the total height of the catalyst bed in the reactor. Catalyst D4 was then uniformly packed above the graded catalyst bed.

In this example, the voidage of the island zone was 176.9% of the voidage of the sea zone, $Li/L0=0.75$, the number of island zones was 55, the shortest distance from any point in the cross section of the sea zone to an edge of the cross section of an adjacent island zone was not greater than 60 mm, the particle size of the hydrogenation catalyst I was 2 mm, and the particle size of the hydrogenation catalyst II was 0.6 mm.

Example 30

Catalyst D5 and Catalyst A5 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D5 and the catalyst A5 were first packed in the lower part of the reactor in accordance with the grading loading scheme of the present application, and as viewed in cross section, 45 cylinders were uniformly distributed in the reactor, with each cylinder having a diameter of 30 mm, the catalyst A5 was packed in the cylinders, and the rest part was packed with the catalyst D5, similar to that shown in FIG. 3. The height of the catalyst bed of the grading packing section accounted for 50% of the total height of the catalyst bed in the reactor. Catalyst D5 was then uniformly packed over the graded catalyst bed.

In this example, the voidage of the island zone was 143.9% of the voidage of the sea zone, $Li/L0=0.5$, the number of the island zones was 45, the shortest distance from any point in the cross section of the sea zone to an edge of the cross section of an adjacent island zone was not greater than 95 mm, the particle size of the hydrogenation catalyst I was 5 mm, and the particle size of the hydrogenation catalyst II was 3 mm.

Example 31

Catalyst D1 and Catalyst A6 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D1 and the catalyst A6 was first packed in the lower part of the reactor in accordance with the grading loading scheme of the present application, and as viewed in cross section, 145 cylinders were uniformly distributed in the reactor, with each cylinder having a diameter of 50 mm, the catalyst A6 was packed in the cylinders, and the rest part was packed with the catalyst D1, similar to that shown in FIG. 3. The height of the catalyst bed of the grading packing section accounted for 45% of the total height of the catalyst bed in the reactor. Catalyst D1 was then uniformly packed over the graded catalyst bed.

In this example, the voidage of the island zone was 270.8% of the voidage of the sea zone, $Li/L0=0.45$, the number of island zones was 145, the shortest distance from any point in the cross section of the sea zone to an edge of the cross section of an adjacent island zone was not greater than 60 mm, the particle size of the hydrogenation catalyst I was 20 mm, and the particle size of the hydrogenation catalyst II was 1.5 mm.

Example 32

Catalyst D3 and Catalyst A7 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D3 and the catalyst A7 were first packed in the lower part of the reactor in accordance with the grading loading scheme of the present application, and as viewed in cross section, 65 cylinders were uniformly distributed in the reactor, with each cylinder having a diameter of 140 mm, the catalyst A7 was packed in the cylinders, and the rest part was packed with the catalyst D3, similar to that shown in FIG. 3. The height of the catalyst bed of the grading packing section accounted for 50% of the total height of the catalyst bed in the reactor. Catalyst D3 was then uniformly packed over the graded catalyst bed.

In this example, the voidage of the island zone was 285.7% of the voidage of the sea zone, $Li/L0=0.5$, the number of island zones was 65, the shortest distance from any point in the cross section of the sea zone to an edge of the cross section of an adjacent island zone was not greater than 100 mm, the particle size of the hydrogenation catalyst I was 46 mm, and the particle size of the hydrogenation catalyst II was 1.7 mm.

Example 33

Catalyst D7 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D7 and the catalyst A3 were first packed in the lower part of the reactor in accordance with the grading loading scheme of the present application, and as viewed in cross section, 30 cylinders were uniformly distributed in the reactor, with each cylinder having a diameter of 30 mm, the catalyst A3 was packed in the cylinders, and the rest part was packed with the catalyst D7, similar to that shown in FIG. 3. The height of the catalyst bed of the grading packing section accounted for 60% of the total height of the catalyst bed in the reactor. Then catalyst D7 was uniformly packed above the graded catalyst bed.

In this example, the voidage of the island zone was 280.1% of the voidage of the sea zone, $Li/L0=0.6$, the number of the island zones was 30, the shortest distance from any point in the cross section of the sea zone to an edge of the cross section of an adjacent island zone was not greater than 85 mm, the particle size of the hydrogenation catalyst I was 6 mm, and the particle size of the hydrogenation catalyst II was 2 mm.

Example 34

Catalyst D8 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D8 and the catalyst A3 were first packed in the lower part of the reactor in accordance with the grading loading scheme of the present application, and as viewed in cross section, 5 cylinders were uniformly distributed in the reactor, with each cylinder having a diameter of 150 mm, the catalyst A3 was packed in the cylinders, and the rest part was packed with the catalyst D8, similar to that shown in FIG. 3. The height of the catalyst bed of the grading packing section accounted for 45% of the total height of the catalyst bed in the reactor. Catalyst D8 was then uniformly packed over the graded catalyst bed.

In this example, the voidage of the island zone was 135.6% of the voidage of the sea zone, $Li/L0=0.45$, the number of island zones was 5, the shortest distance from any point in the cross section of the sea zone to an edge of the cross section of an adjacent island zone was not greater than 100 mm, the particle size of the hydrogenation catalyst I was 6 mm, and the particle size of the hydrogenation catalyst II was 3.5 mm.

Example 35

Catalyst D9 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D9 and the catalyst A3 were first packed in the lower part of the reactor in accordance with the grading loading scheme of the present application, and as viewed in cross section, 35 cylinders were uniformly distributed in the reactor, with each cylinder having a diameter of 30 mm, the catalyst A3 was packed in the cylinders, and the rest part was packed with the catalyst D9, similar to that shown in FIG. 3. The height of the catalyst bed of the grading packing section accounted for 15% of the total height of the catalyst bed in the reactor. Catalyst D9 was then uniformly packed above the graded catalyst bed.

In this example, the voidage of the island zone was 200.8% of the voidage of the sea zone, $Li/L0=0.15$, the number of island zones was 35, the shortest distance from any point in the cross section of the sea zone to an edge of the cross section of an adjacent island zone was not greater than 70 mm, the particle size of the hydrogenation catalyst I was 6 mm, and the particle size of the hydrogenation catalyst II was 2 mm.

Example 36

Catalyst D10 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D10 and the catalyst A3 were first packed in the lower part of the reactor in accordance with the grading loading scheme of the present application, and as viewed in cross section, 18 cylinders were uniformly distributed in the reactor, with each cylinder having a diameter of 25 mm, the catalyst A3 was packed in the cylinders, and the rest part was packed with the catalyst D10, similar to that shown in FIG. 3. The height of the catalyst bed of the grading packing section accounted for 60% of the total height of the catalyst bed in the reactor. Catalyst D10 was then uniformly packed above the graded catalyst bed.

In this example, the voidage of the island zone was 215.5% of the voidage of the sea zone, $Li/L0=0.6$, the number of island zones was 18, the shortest distance from any point in the cross section of the sea zone to an edge of the cross section of an adjacent island zone was not greater than 520 mm, the particle size of the hydrogenation catalyst I was 6 mm, and the particle size of the hydrogenation catalyst II was 1.6 mm.

Example 37

Catalyst D11 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D11 and the catalyst A3 were first packed in the lower part of the reactor in accordance with the grading loading scheme of the present application, and as viewed in cross section, 18 cylinders were uniformly distributed in the reactor, with each cylinder having a diameter of 30 mm, the catalyst A3 was packed in the cylinders, and the rest part was packed with the catalyst D11, similar to that shown in FIG. 3. The height of the catalyst bed of the grading packing section accounted for 60% of the total height of the catalyst bed in the reactor. Catalyst D11 was then uniformly packed over the graded catalyst bed.

In this example, the voidage of the island zone was 197% of the voidage of the sea zone, $Li/L0=0.6$, the number of island zones was 18, the shortest distance from any point in the cross section of the sea zone to an edge of the cross section of an adjacent island zone was not greater than 310 mm, the particle size of the hydrogenation catalyst I was 6 mm, and the particle size of the hydrogenation catalyst II was 2.5 mm.

Example 38

Catalyst D12 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D12 and the catalyst A3 were first packed in the lower part of the reactor in accordance with the grading loading scheme of the present application, and as viewed in cross section, 10 cylinders were uniformly distributed in the reactor, with each cylinder having a diameter of 100 mm, the catalyst A3 was packed in the cylinders, and the rest part was packed with the catalyst D12, similar to that shown in FIG. 3. The height of the catalyst bed of the grading packing section accounted for 30% of the total height of the catalyst bed in the reactor. Catalyst D12 was then uniformly packed over the graded catalyst bed.

In this example, the voidage of the island zone was 157.4% of the voidage of the sea zone, $Li/L0=0.3$, the number of the island zones was 10, the shortest distance from any point in the cross section of the sea zone to an edge of the cross section of an adjacent island zone was not greater than 157 mm, the particle size of the hydrogenation catalyst I was 6 mm, and the particle size of the hydrogenation catalyst II was 3.2 mm.

Example 39

Catalyst D13 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D13 and the catalyst A3 were first packed in the lower part of the reactor in accordance with the grading loading scheme of the present application, and as viewed in cross section, 15 cylinders were uniformly distributed in the reactor, with each cylinder having a diameter of 50 mm, the catalyst A3 was packed in the cylinders, and the rest part was packed with the catalyst D13, similar to that shown in FIG. 3. The height of the catalyst bed of the grading packing section accounted for 60% of the total height of the catalyst bed in the reactor. Catalyst D13 was then uniformly packed over the graded catalyst bed.

In this example, the voidage of the island zone was 124.9% of the voidage of the sea zone, $Li/L0=0.6$, the number of island zones was 15, the shortest distance from any point in the cross section of the sea zone to an edge of the cross section of an adjacent island zone was not greater than 60 mm, the particle size of the hydrogenation catalyst I was 6 mm, and the particle size of the hydrogenation catalyst II was 4 mm.

Example 40

Catalyst D14 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D14 and the catalyst A3 were packed in the lower part of the reactor in accordance with the grading loading scheme of the present application, and as viewed in cross section, 75 cylinders were uniformly distributed in the reactor, with each cylinder having a diameter of 40 mm, the catalyst A3 was packed in the cylinders, and the rest part was packed with the catalyst D14, similar to that shown in FIG. 3. The height of the catalyst bed of the grading packing section accounted for 60% of the total height of the catalyst bed in the reactor. Catalyst D14 was then uniformly packed over the graded catalyst bed.

In this example, the voidage of the island zone was 230% of the voidage of the sea zone, $Li/L0=0.6$, the number of the island zones was 75, the shortest distance from any point in the cross section of the sea zone to an edge of the cross section of an adjacent island zone was not greater than 400 mm, the particle size of the hydrogenation catalyst I was 6 mm, and the particle size of the hydrogenation catalyst II was 2.8 mm.

Example 41

Catalyst D15 and Catalyst A3 were Packed into a Cylindrical Hydrogenation Reactor:

The reactor was an upflow reactor, in which oils to be hydrogenated and hydrogen were introduced into the lower part of the reactor, and the reaction effluent was withdrawn from the upper part. In the packing, the catalyst D15 and the catalyst A3 were first packed in the lower part of the reactor in accordance with the grading loading scheme of the present application, and as viewed in cross section, 30 cylinders were uniformly distributed in the reactor, with each cylinder having a diameter of 30 mm, the catalyst A3 was packed in the cylinders, and the rest part was packed with the catalyst D15, similar to that shown in FIG. 3. The height of the catalyst bed of the grading packing section accounted for 90% of the total height of the catalyst bed in the reactor. Catalyst D15 was then uniformly packed over the graded catalyst bed.

In this example, the voidage of the island zone was 143.0% of the voidage of the sea zone, $Li/L0=0.9$, the number of island zones was 30, the shortest distance from any point in the cross section of the sea zone to an edge of the cross section of an adjacent island zone was not greater than 110 mm, the particle size of the hydrogenation catalyst I was 6 mm, and the particle size of the hydrogenation catalyst II was 3.6 mm.

Example 42

The packing was carried out as described in Example 31, except that D1 and A6 were replaced by D6 and A8, respectively, and the other conditions were kept unchanged.

Comparative Example 1

Only catalyst D1 was packed in the same hydrogenation reactor as in Example 26, with the volume of catalyst D1 being equal to the total volume of the two catalysts in Example 26.

Comparative Example 2

Only catalyst A2 was packed in the same hydrogenation reactor as in Example 27, with the volume of catalyst A2 being equal to the total volume of the two catalysts in Example 27.

Comparative Example 3

In the same hydrogenation reactor as in Example 28, the sites of catalyst A3 were replaced with 4 stainless steel ash accumulation baskets of the same size formed by welded Johnson screen, of which the hollow was not packed with catalyst, and the top was open. The rest of the reactor was packed with catalyst D3 in the same volume as in Example 28.

Comparative Example 4

In the same hydrogenation reactor as in Example 30, D5 was replaced with D16 of the same volume as the catalyst, and the other conditions were kept unchanged. In this comparative example, the voidage of the island zone was 105.7% of the voidage of the sea zone.

Comparative Example 5

In the same hydrogenation reactor as in Example 30, D5 was replaced with D17 of the same volume as the catalyst, and the other conditions were kept unchanged. In this comparative example, the voidage of the island zone was 308% of the voidage of the sea zone.

Comparative Example 6

In the same upflow hydrogenation reactor as in Example 30, the reactor was packed in a graded manner throughout its height, and as viewed in cross section, 45 cylinders were uniformly distributed in the reactor, with each cylinder having a diameter of 30 mm, the catalyst A5 was packed in the cylinders, and the rest part was packed with the catalyst D5, so that $Li/L0=1$, with other conditions being kept unchanged. In this comparative example, the voidage of the island zone was 143.9% of the voidage of the sea zone.

Comparative Example 7

In the same upflow reactor as in Example 28, a mixed catalyst composed of uniformly mixed catalyst A3 and catalyst D3 was packed in the lower part of the reactor to a height of 60%, and the rest upper part was packed with the catalyst D3, and the amounts of both catalysts used were the same as in Example 28.

Comparative Example 8

In the same upflow reactor as in Example 28, the lower part of the reactor was packed with the catalyst A3 in the same amount as the catalyst A3 used in Example 28, and the rest upper part of the reactor was packed with the catalyst D3.

Evaluation of Reaction Performance:

Reaction was carried out using the reactors packed with catalysts in Examples 26-42 and Comparative Examples 1-8 as follows:

(1) Sulfurization: wet sulfurization was performed, in which a diesel oil feedstock and hydrogen were introduced into the reactor, and the pressure was increased to 4.0 MPa. The temperature was raised to 160° C., and then a sulfurizing agent carbon disulfide was introduced in an amount of 10 wt %, based on the total weight of the catalyst. The temperature was further raised to 300° C., the sulfurization was carried out at constant temperature for 19 hours, and the resultant was cooled to room temperature for further experiment.

(2) hydrodesulfurization reaction: a reaction was carried out at a reaction temperature of 410° C., a reaction pressure of 12 MPa, a liquid hourly space velocity of 0.4 $h^{-1}$, a hydrogen-to-oil ratio of 1200:1, and a flow pattern of the reactor described in each example. The feedstock oil was atmospheric residue of a refinery of Sinopec, having a sulfur content of 3.1%, a metal (Ni+V) content of 81 ppm, and a carbon residue of 13%.

The sulfur content of the product oil was analyzed, and the results are shown in Table 1.

TABLE 1

Evaluation of the activity

| Example No. | Graded catalyst | Sulfur content of product oil in first 50 hours, % | Time required to obtain an increase of the pressure drop of 0.1 MPa |
|---|---|---|---|
| Example 26 | A1, D1 | 0.43 | 239 |
| Example 27 | A2, D2 | 0.32 | 273 |
| Example 28 | A3, D3 | 0.81 | 419 |
| Example 29 | A4, D4 | 1.07 | 342 |
| Example 30 | A5, D5 | 0.26 | 459 |
| Example 31 | A6, D1 | 0.51 | 325 |
| Example 32 | A7, D3 | 1.15 | 312 |
| Example 33 | A3, D7 | 0.84 | 341 |
| Example 34 | A3, D8 | 0.97 | 325 |
| Example 35 | A3, D9 | 0.64 | 321 |
| Example 36 | A3, D10 | 0.92 | 268 |
| Example 37 | A3, D11 | 0.86 | 329 |
| Example 38 | A3, D12 | 1.09 | 320 |
| Example 39 | A3, D13 | 1.04 | 328 |
| Example 40 | A3, D14 | 0.99 | 323 |
| Example 41 | A3, D15 | 1.11 | 334 |
| Example 42 | A8, D6 | 2.15 | 278 |
| Comparative Example 1 | D1 | 0.13 | 46 |
| Comparative Example 2 | A2 | 2.35 | 105 |
| Comparative Example 3 | D3 | 1.53 | 85 |
| Comparative Example 4 | A5, D16 | 1.24 | 217 |
| Comparative Example 5 | A5, D17 | 1.27 | 225 |
| Comparative Example 6 | A5, D5 | 1.92 | 230 |
| Comparative Example 7 | A3, D3 | 1.65 | 116 |
| Comparative Example 8 | A3, D3 | 1.46 | 139 |

The invention claimed is:

1. A section of a solid particle bed, comprising a sea zone and one or more island zones distributed in the sea zone and having an upper surface, a lower surface, an axial direction that is a length direction or a direction of a material flow in the solid particle bed from the upper surface to the lower surface, and a radial direction which is a cross-sectional direction or a direction perpendicular to the axial direction, wherein the island zone extends along the axial direction of the solid particle bed without reaching the lower surface, and a voidage of the island zone is 110-300% of a voidage of the sea zone.

2. The solid particle bed according to claim 1, wherein the sea zone extends from the upper surface to the lower surface along the axial direction of the solid particle bed, and/or,
the at least one island zone is distributed in the sea zone in a manner selected from the group consisting of:
i) a manner in which the at least one island zone is distributed discretely in the sea zone;
ii) a manner in which the at least one island zone is arranged in the form of an annulus surrounding a portion of the sea zone; and
iii) a combination of the two manners i) and ii).

3. The solid particle bed according to claim 2, comprising a plurality of island zones distributed in the sea zone, and a length of the sea zone in the axial direction of the solid particle bed is L0, wherein:
a length of each island zone in the axial direction of the solid particle bed is Li, and Li/L0≤0.95, and/or, the plurality of island zones have substantially a same length in the axial direction of the solid particle bed, and/or,
where a maximum among the lengths of the plurality of island zones in the axial direction of the solid particle bed is Lmax, Lmax/L0<1, and/or,
at least a part of the plurality of island zones extend along the axial direction of the solid particle bed, forming at least one shape selected from the group consisting of columnar shapes and taper shapes.

4. The solid particle bed according to claim 3, wherein 0.04≤Li/L0≤0.50, and/or, Lmax/L0=0.8–0.5, and/or, each island zone extends along the axial direction of the solid particle bed, forming at least one shape selected from the group consisting of cylindrical shapes, prismatic shapes, pyramidal shapes, and conical shapes.

5. The solid particle bed according to claim 1, wherein a number of island zones is n, n is an integer from 1 to 2000, and
the island zones, being the same as or different from each other, each independently has a cross section that is at least one selected from the group consisting of rectangle, circle, ellipse, triangle, parallelogram, ring, and irregular shape, and/or,
a total of the island zones accounts for 0.3-57% and the sea zone accounts for 43-99.7% of a total volume of the solid particle bed.

6. The solid particle bed according to claim 5, wherein n is an integer from 3 to 50, and/or, in the cross section of the solid particle bed, the island zones, being the same as or different from each other, each independently has a cross section that is in at least one shape selected from the group consisting of rectangle, circle, ellipse, triangle, parallelogram, and ring, and/or, the total of the island zones accounts for 3-25% and the sea zone accounts 75-97% of the total volume of the solid particle bed.

7. The solid particle bed according to claim 1, wherein the island zones, being the same as or different from each other, each independently has a voidage of 0.20 to 0.90, and/or, the sea zone has a voidage of 0.10 to 0.80.

8. The solid particle bed according to claim 1, wherein in a cross section of the solid particle bed:
a straight-line distance between edges of two adjacent island zones is greater than 20 mm, and/or,
when an island zone is present, the shortest distance between a point in the cross section of the sea zone and an edge of the cross section of an adjacent island zone is no greater than 500 mm, and/or,
the island zones, being the same as or different from each other, each independently has a cross-sectional area of no greater than 300000 $mm^2$, and/or,
a cross-sectional area is no greater than 3000000 $mm^2$, and/or,
when an island zone is present, the total cross-sectional area of all island zones accounts for 10-60% of the cross-sectional area of the solid particle bed.

9. The solid particle bed according to claim 1, wherein each island zone comprises a hydrogenation catalyst I, the sea zone comprises a hydrogenation catalyst II,
and the hydrogenation catalyst I is present in the form of hollow and/or toothed particles, the hydrogenation catalyst II is present in the form of porous particles, and/or,
the hydrogenation catalyst I has a particle size of 2.0-55.0 mm, the hydrogenation catalyst II has a particle size of 0.5-4.0 mm, and/or, the hydrogenation catalyst I comprises a carrier and a hydrogenation active metal, the hydrogenation catalyst II is at least one selected from the group consisting of supported catalysts and unsupported catalysts, and the supported catalyst comprises a carrier and a hydrogenation active component, the unsupported catalyst comprises a binder and a hydrogenation active component, and a ratio of a mass content of the hydrogenation active metal, calculated as metal oxide in the hydrogenation catalyst I and based on the total weight of the hydrogenation catalyst I to the mass content of the hydrogenation active component, calculated as metal oxide in the hydrogenation catalyst II and based on the total weight of the hydrogenation catalyst II is 10-90%, and/or, the hydrogenation catalyst I comprises more than one catalysts, each independently having a same or different voidage, and the hydrogenation catalyst II comprises more than one catalysts, each independently has a same or different voidage, with the proviso that a voidage of a catalyst amongst the hydrogenation catalyst I is greater than a voidage of a catalyst amongst the hydrogenation catalyst II.

10. The solid particle bed according to claim 9, wherein in the hydrogenation catalyst I, the hydrogenation active metal is present in an amount of 5-30% by mass, calculated as metal oxide and based on the total weight of the hydrogenation catalyst I, and/or, the carrier is at least one selected from the group consisting of activated carbon, inorganic refractory oxides and molecular sieves, and/or, the hydrogenation active metal is at least one selected from the group consisting of Fe, Co, Ni, Cu, Zn, Cr, Mo and W.

11. The solid particle bed according to claim 10, wherein in the hydrogenation catalyst I, the hydrogenation active metal is present in an amount of 8-20% by mass, calculated as metal oxide and based on the total weight of the hydrogenation catalyst, and/or, the inorganic refractory oxides is at least one selected from alumina, silica, magnesia, zirconia and titania, and/or, the hydrogenation active metal is at least one selected from the group consisting of Fe and Ni.

12. The solid particle bed according to claim 9, wherein in the hydrogenation catalyst II, the hydrogenation active component is present in an amount of 15-40% by mass, calculated as metal oxide and based on the total weight of the supported catalyst, and/or, the hydrogenation active component is present in an amount of 30-80% by mass, calculated as metal oxide and based on the total weight of the unsupported catalyst, and/or, the carrier is an inorganic refractory oxide, and/or, the binder is an inorganic refractory oxide, and/or, the hydrogenation active component is at least one selected from the group consisting of metals of Groups VIB and VIII of the periodic table, and/or, based on the total weight of the supported catalyst, the Group VIB metal is present in an amount of 15-30% by mass calculated as metal oxide and the Group VIII metal is present in an amount of 2-10% by mass calculated as metal oxide, and/or, based on the total weight of the unsupported catalyst, the Group VIB metal is present in an amount of 15-30% by mass calculated as metal oxide, and the Group VIII metal is present in an amount of 2-10% by mass calculated as metal oxide.

13. The solid particle bed according to claim 12, wherein in the hydrogenation catalyst II, the hydrogenation active component is present in an amount of 20-35% by mass, calculated as metal oxide and based on the total weight of the supported catalyst, and/or, the hydrogenation active component is present in an amount of 40-65% by mass, calculated as metal oxide and based on the total weight of the unsupported catalyst, and/or, the carrier is at least one selected from the group consisting of alumina and silica, and/or, the binder is at least one selected from the group consisting of alumina and silica, and/or, the Group VIB metal is Mo and/or W and the group VIII metal is Co and/or Ni, and/or, based on the total weight of the supported catalyst, the Group VIB metal is present in an amount of 18-27% by mass calculated as metal oxide and the Group VIII metal is present in an amount of 3-7% by mass calculated as metal oxide, and/or, based on the total weight of the unsupported catalyst, the Group VIB metal is present in an amount of 18-27% by mass calculated as metal oxide, and the Group VIII metal is present in an amount of 3-7% by mass calculated as metal oxide.

14. The solid particle bed according to claim 9, wherein the hydrogenation catalyst I has a particle size of 3.0-30.0 mm, and the hydrogenation catalyst II has a particle size of 0.8-3.0 mm, and/or, the ratio of the mass content of the hydrogenation active metal, calculated as metal oxide, in the hydrogenation catalyst I, based on the total weight of the hydrogenation catalyst I, to the mass content of the hydrogenation active component, calculated as metal oxide, in the hydrogenation catalyst II, based on the total weight of the hydrogenation catalyst II, is 17-40%, and/or, the hydrogenation catalyst I comprises more than one catalysts that are different from each other, and the hydrogenation catalyst II comprises more than one catalysts that are different from each other, the proviso that the voidage of each catalyst amongst the hydrogenation catalyst I is 140-200% of the voidage of each catalyst amongst the hydrogenation catalyst II.

15. A fixed bed, comprising a plurality of sections of solid particle bed, wherein at least one section of the solid particle bed is the solid particle bed according to claim 1, which is referred to as the solid particle bed A.

16. The fixed bed according to claim 15, wherein a height of the solid particle bed A is 1-95% of a height of the fixed bed.

17. The fixed bed according to claim 15, further comprising a solid particle bed B located upstream of the solid particle bed A and/or a solid particle bed C located downstream of the solid particle bed A, wherein a voidage of the solid particle bed B is not smaller than the voidage of the island zone in the solid particle bed A, and a voidage of the solid particle bed C is not greater than the voidage of the sea zone in the solid particle bed A.

18. The fixed bed according to claim 17, wherein the solid particle bed B comprises one or more hydrogenation catalysts B and the solid particle bed C comprises one or more hydrogenation catalysts C, wherein the hydrogenation catalyst B and the hydrogenation catalyst C, being the same or different from each other, are each independently at least one selected from the group consisting of supported catalysts and unsupported catalysts, and the supported catalyst comprises a carrier and a hydrogenation active component, and the unsupported catalyst comprises a binder and a hydrogenation active component.

19. The fixed bed according to claim 18, wherein the hydrogenation catalyst B and the hydrogenation catalyst C, being the same or different from each other, are each independently selected from the hydrogenation catalyst II.

20. The fixed bed according to claim 15, wherein the height of the solid particle bed A is 4-50% of the height of the fixed bed.

21. A process for hydrogenation of oils, comprising a step of passing an oil under hydrogenation conditions through the solid particle bed according to claim 1, referred to as hydrogenation step.

22. The process according to claim 21, wherein the oil is at least one selected from the group consisting of ethylene pyrolysis gasoline, coker naphtha, catalytic gasoline, fischer-tropsch synthesis oil, coker diesel, catalytic diesel, straight-run diesel oil, wax oil, residual oil, coal tar, and coal hydrogenation product oil, and/or, the hydrogenation conditions include: a reaction temperature of 40-500° C., a reaction pressure of 0.3-20 MPaG, a volume space velocity of 1-10 $h^{-1}$, and a hydrogen-to-oil ratio of 10:1 to 2000:1.

23. The process according to claim 22, wherein the reaction temperature is 40-450° C., the reaction pressure is 0.5-15 MPaG, the volume space velocity is 2-10 $h^{-1}$, and the hydrogen-to-oil ratio is 15:1 to 1000:1.

24. The process according to claim 21, further comprising, prior to the hydrogenation step, a step of sulfurizing the solid particle bed or a fixed bed, and/or
sulfurizing a hydrogenation catalyst off-site in advance, and,
the reaction conditions of the sulfurization include: dry sulfurizing or wet sulfurizing with a sulfurizing agent that is at least one selected from the group consisting of hydrogen sulfide, carbon disulfide, dimethyl disulfide, dimethyl sulfide and di-n-butyl sulfide, a sulfurizing pressure of 1.2-15 MPaG, a sulfurizing temperature of 280-400° C. and a sulfurizing time of 4-22 hr.

25. The solid particle bed according to claim 1, wherein the solid particle bed is an axial solid particle bed, and/or, the island zone extends from the upper surface along the axial direction of the solid particle bed but does not extend to the lower surface, and/or, the voidage of the island zone is 140-200%.

26. The solid particle bed according to claim 1, wherein the island zones, being the same as or different from each other, each independently has a voidage of 0.37 to 0.60, and/or, the sea zone has a voidage of 0.16 to 0.55.

27. The solid particle bed according to claim 1, wherein in a cross section of the solid particle bed, the straight-line distance between edges of two adjacent island zones is greater than 100 mm, and/or,
when an island zone is present, the shortest distance between a point in the cross section of the sea zone and an edge of the cross section of an adjacent island zone is no greater than 100 mm, and/or,
in a cross section of the solid particle bed, the island zones, being the same as or different from each other, each independently has a cross-sectional area of no greater than 100000 $mm^2$, and/or,
the solid particle bed has a cross-sectional area of no greater than 2000000 $mm^2$, and/or,
in a cross section of the solid particle bed, when an island zone is present, the total cross-sectional area of all island zones accounts for 18-30% of the cross-sectional area of the solid particle bed.

* * * * *